FIG_36

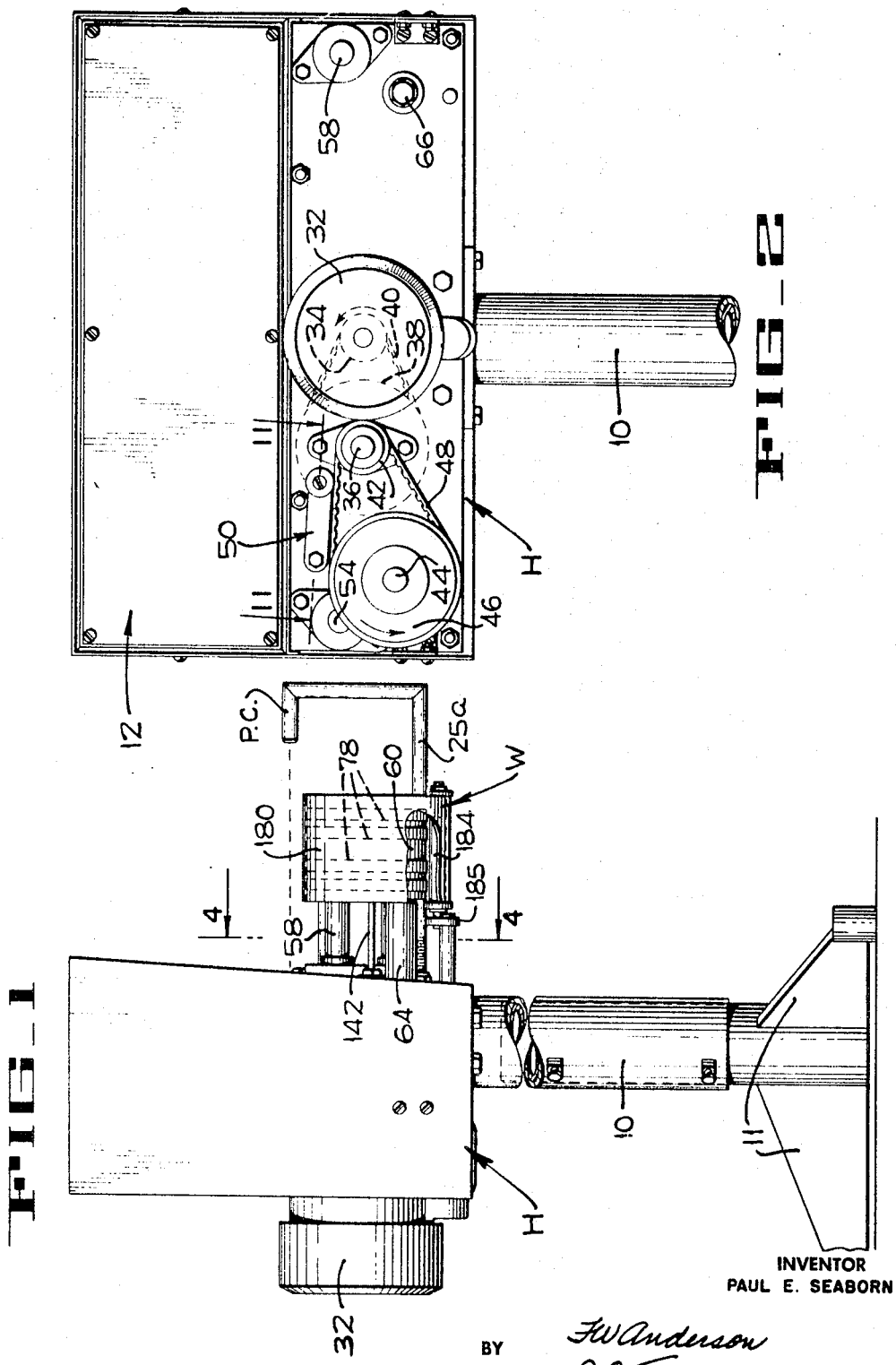

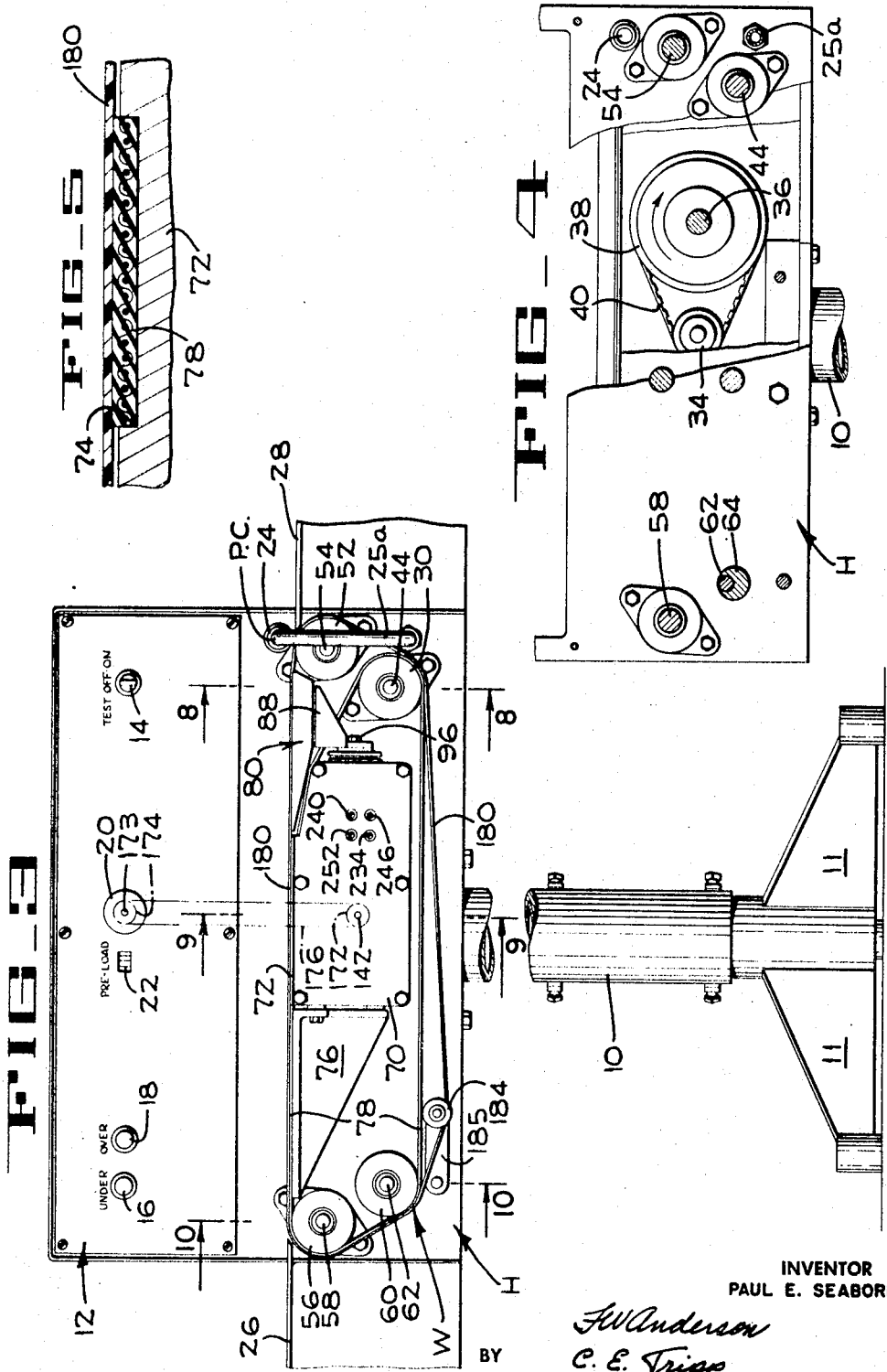

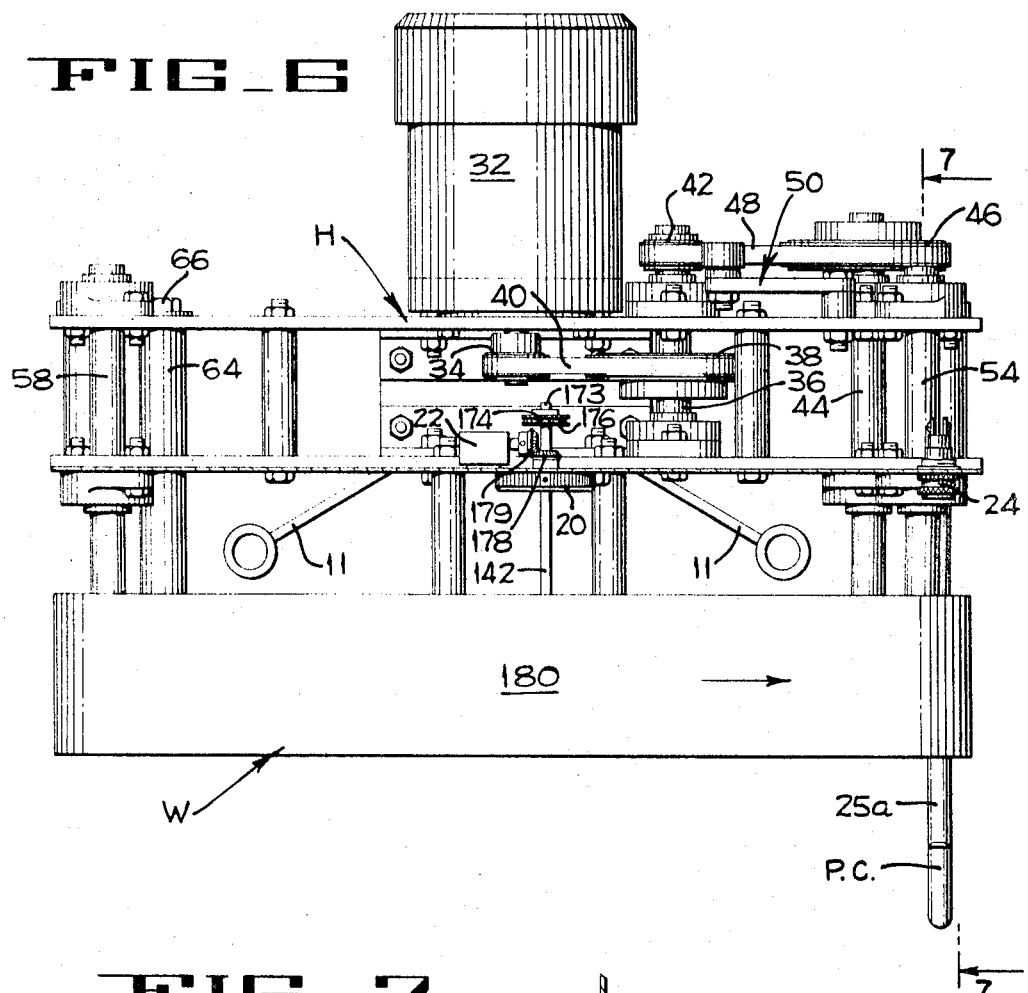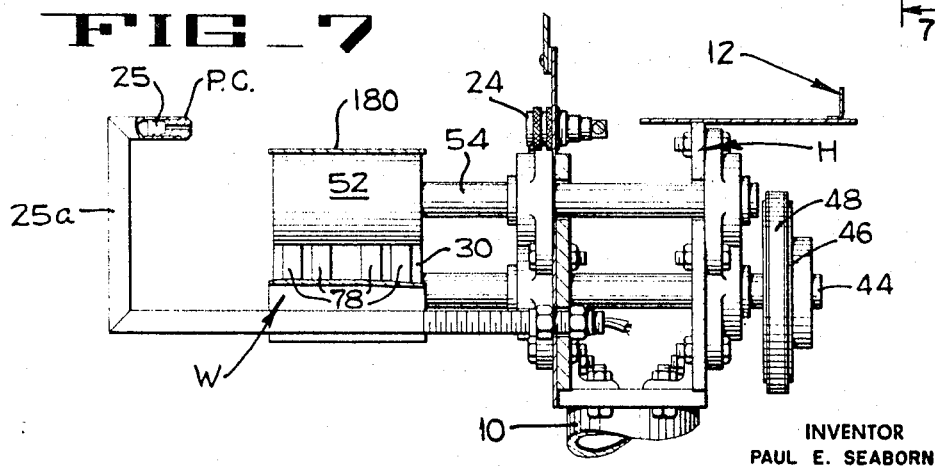

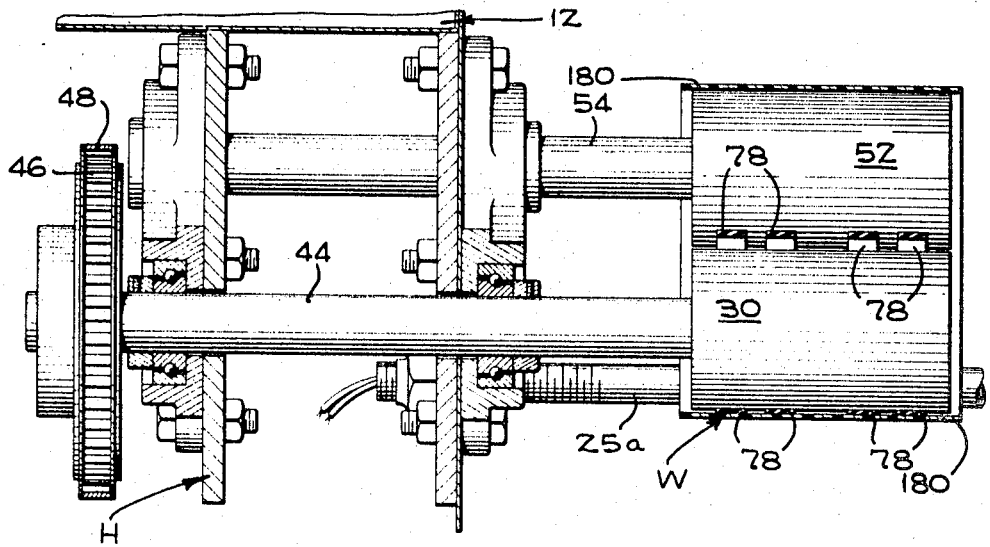
FIG_8
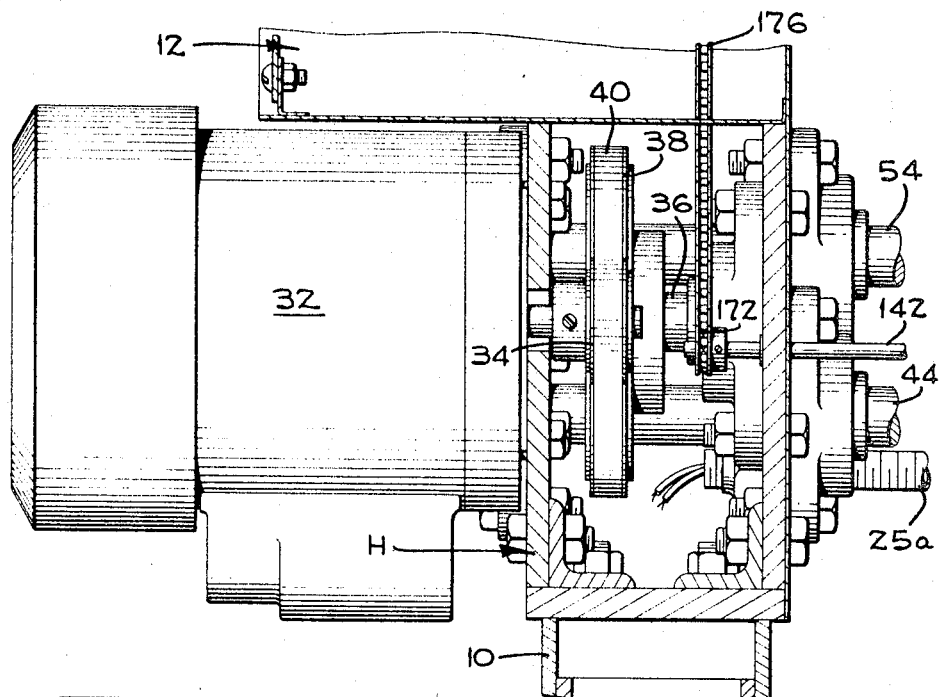
FIG_9

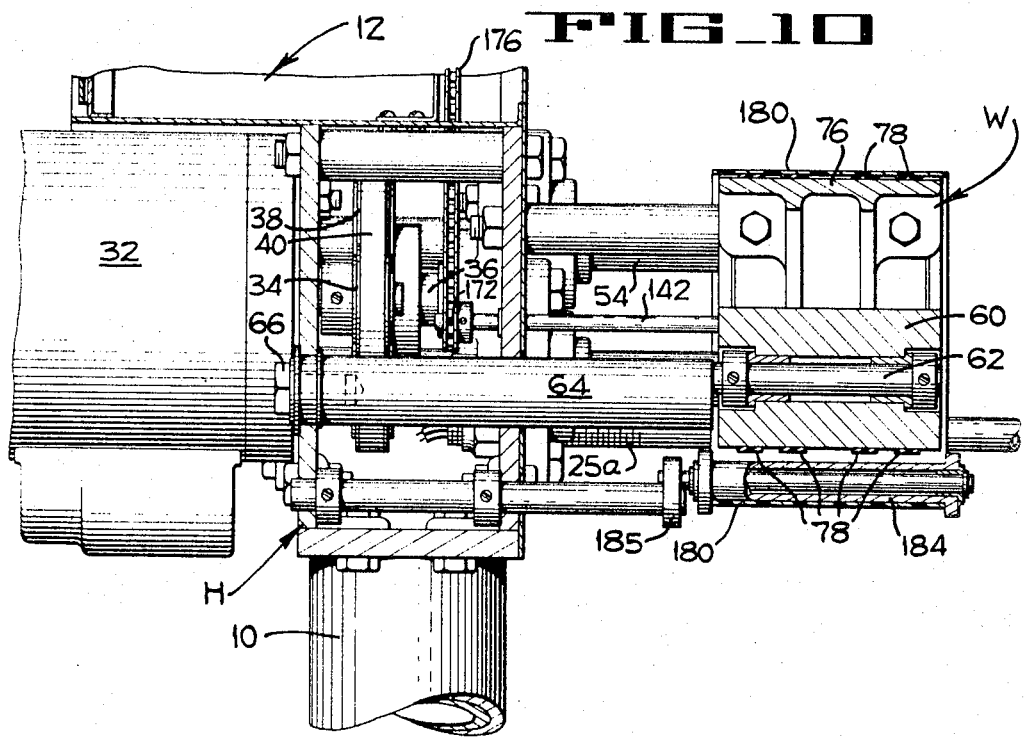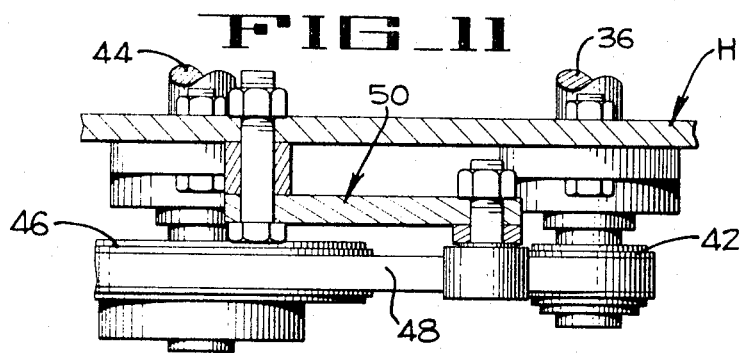

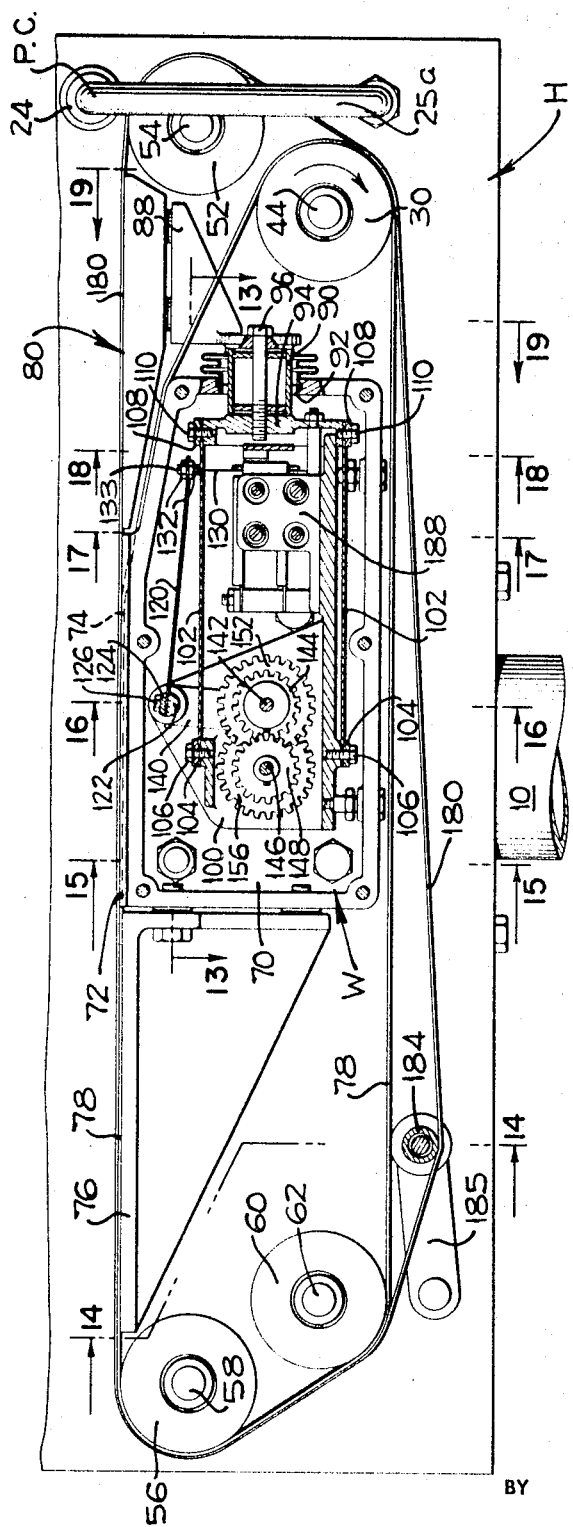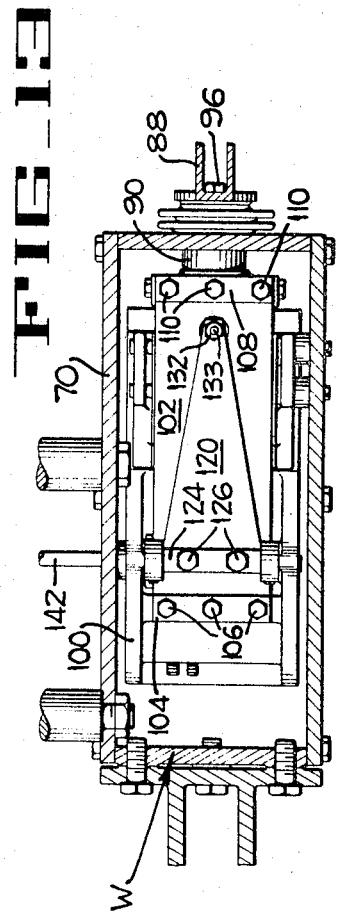

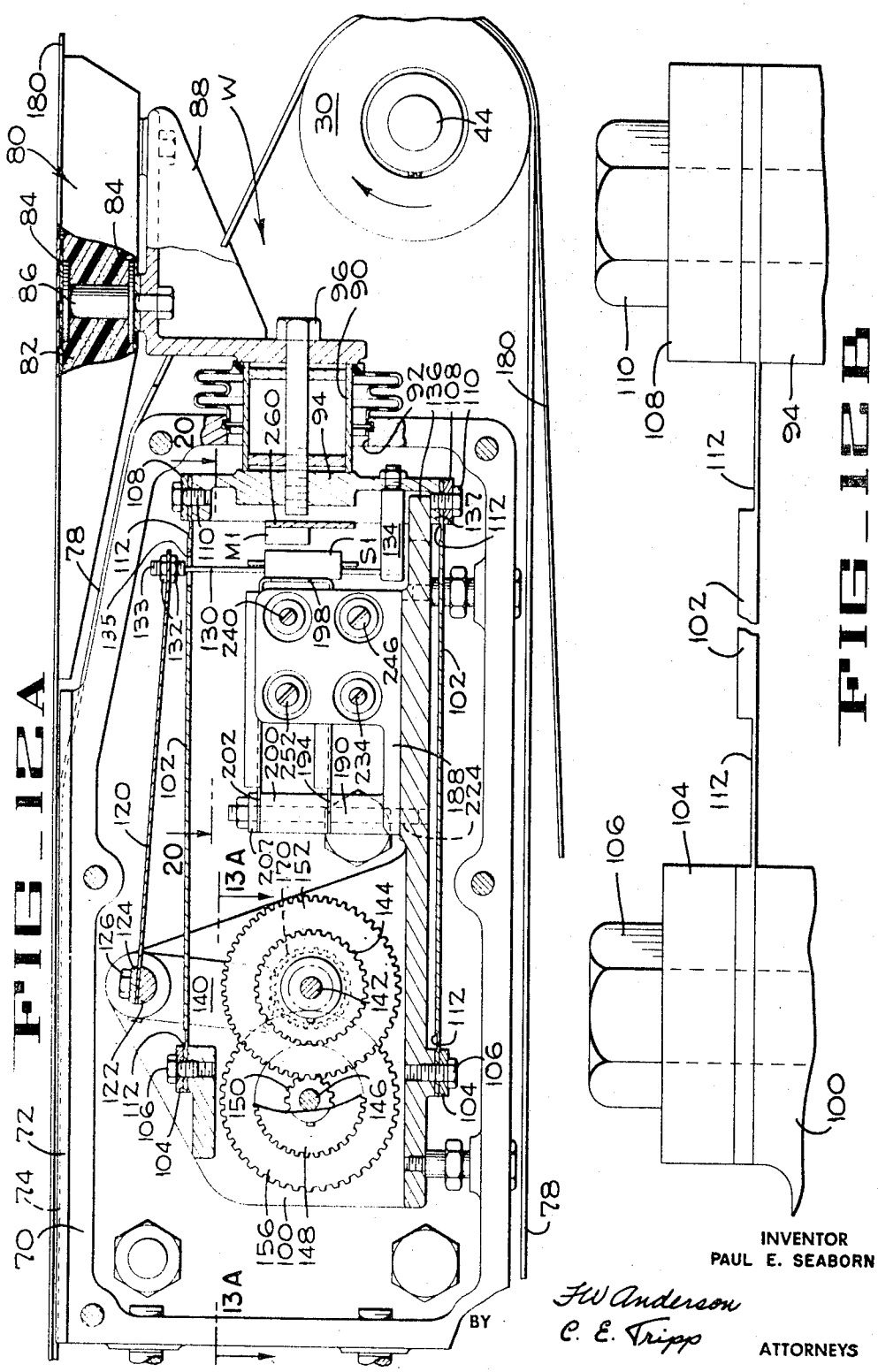

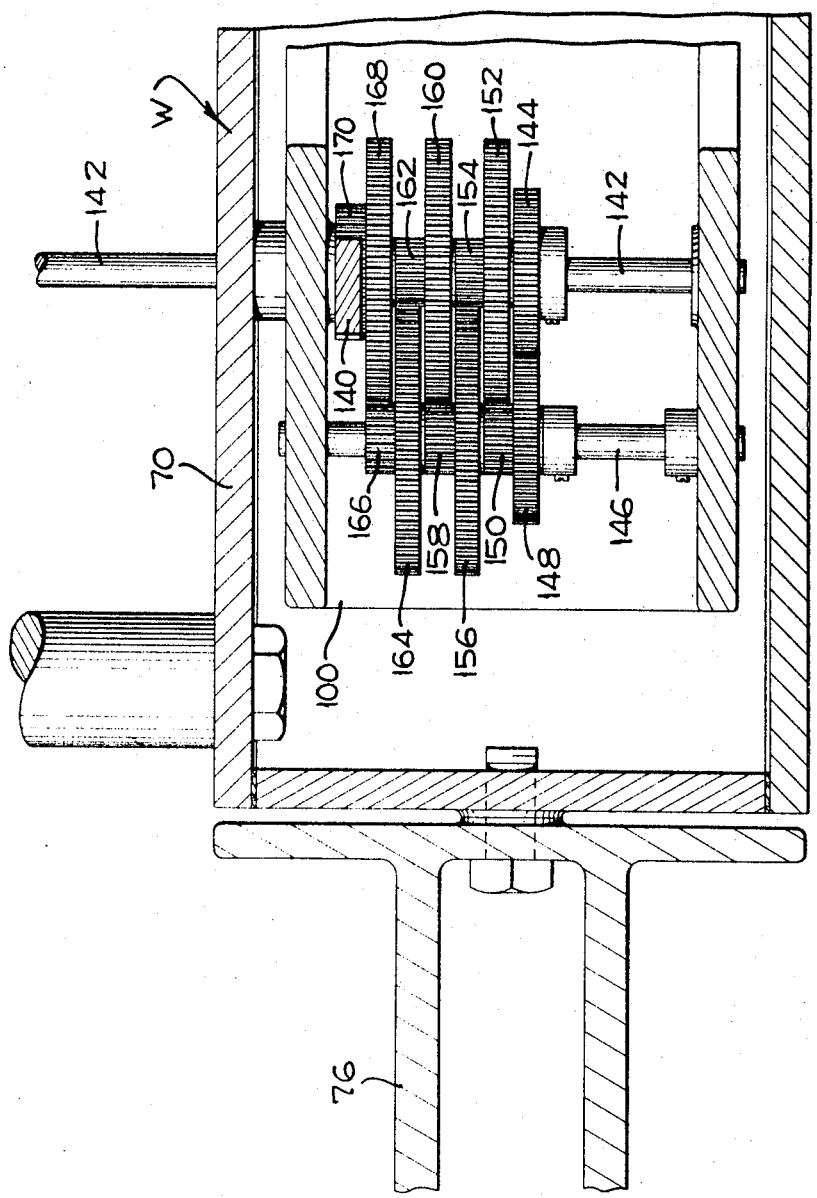

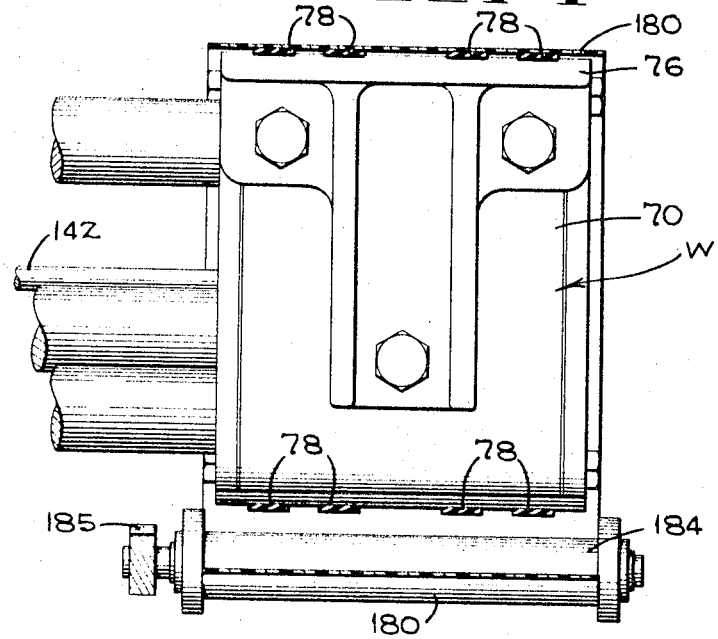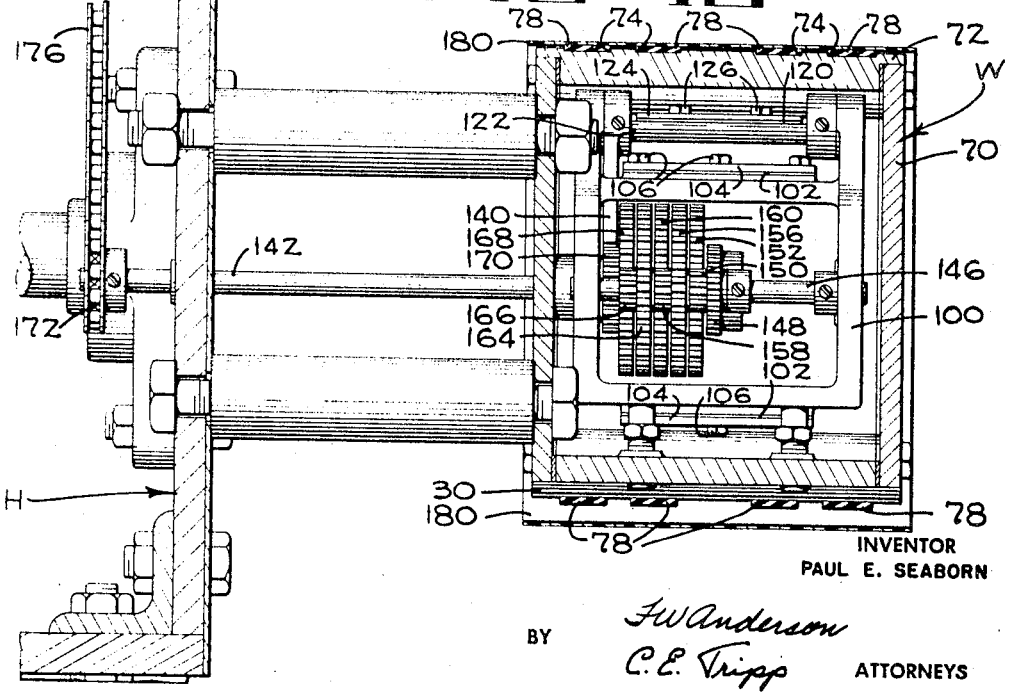

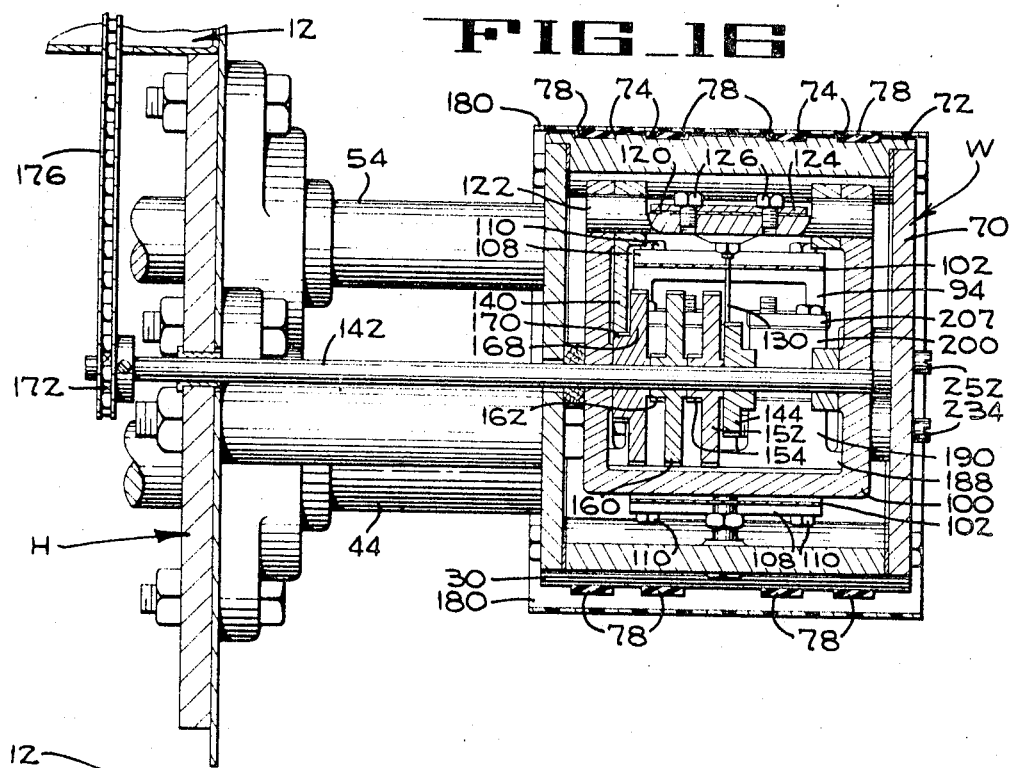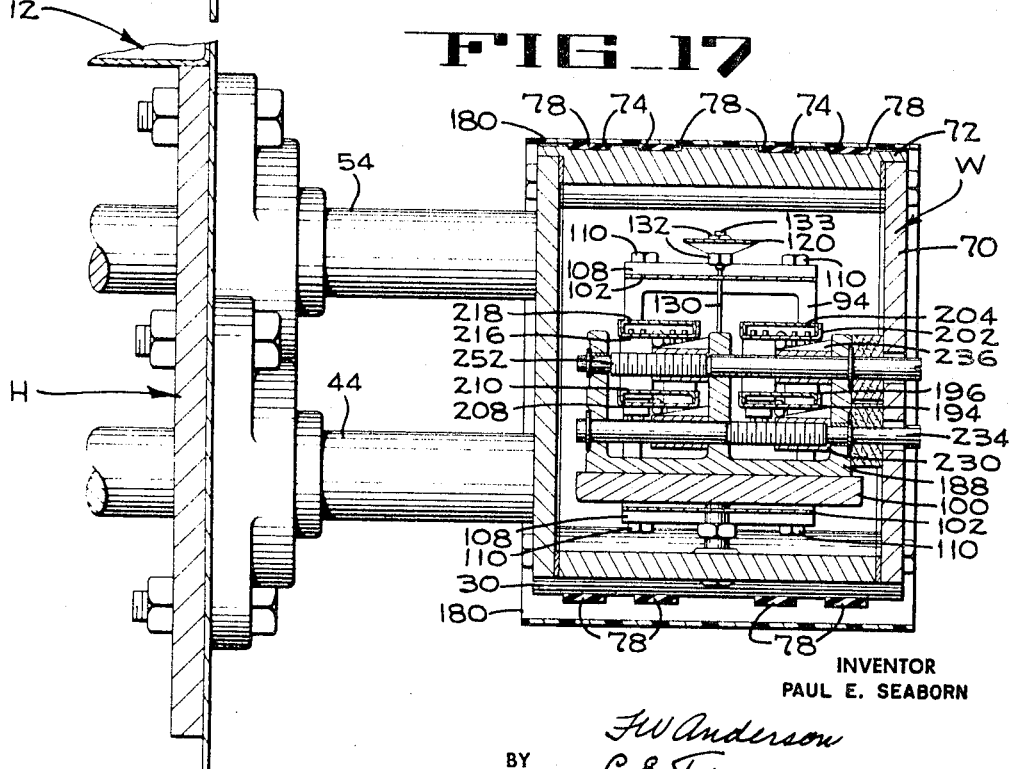

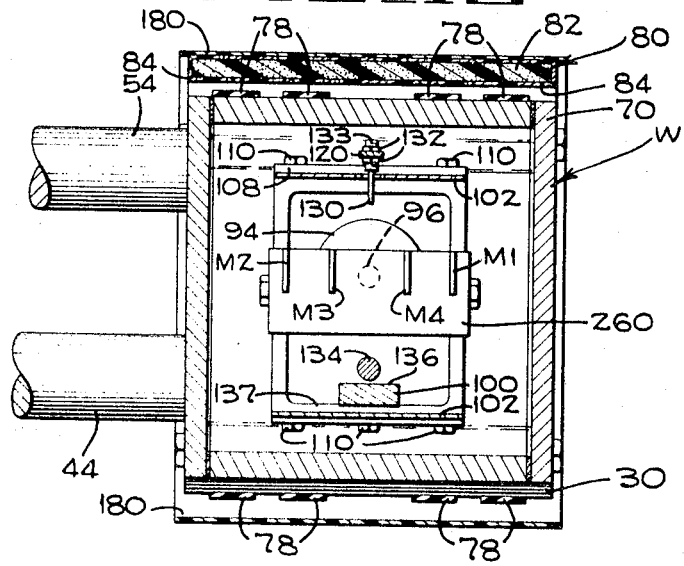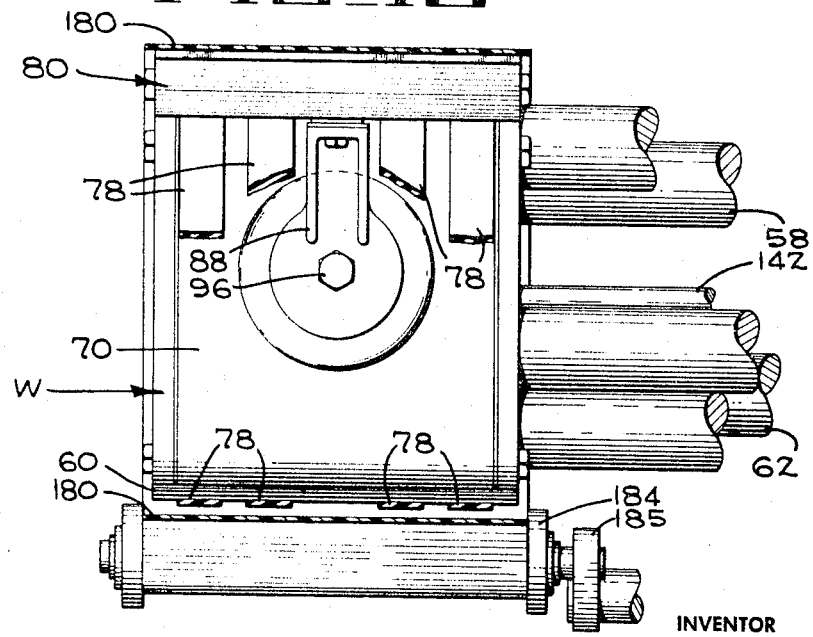

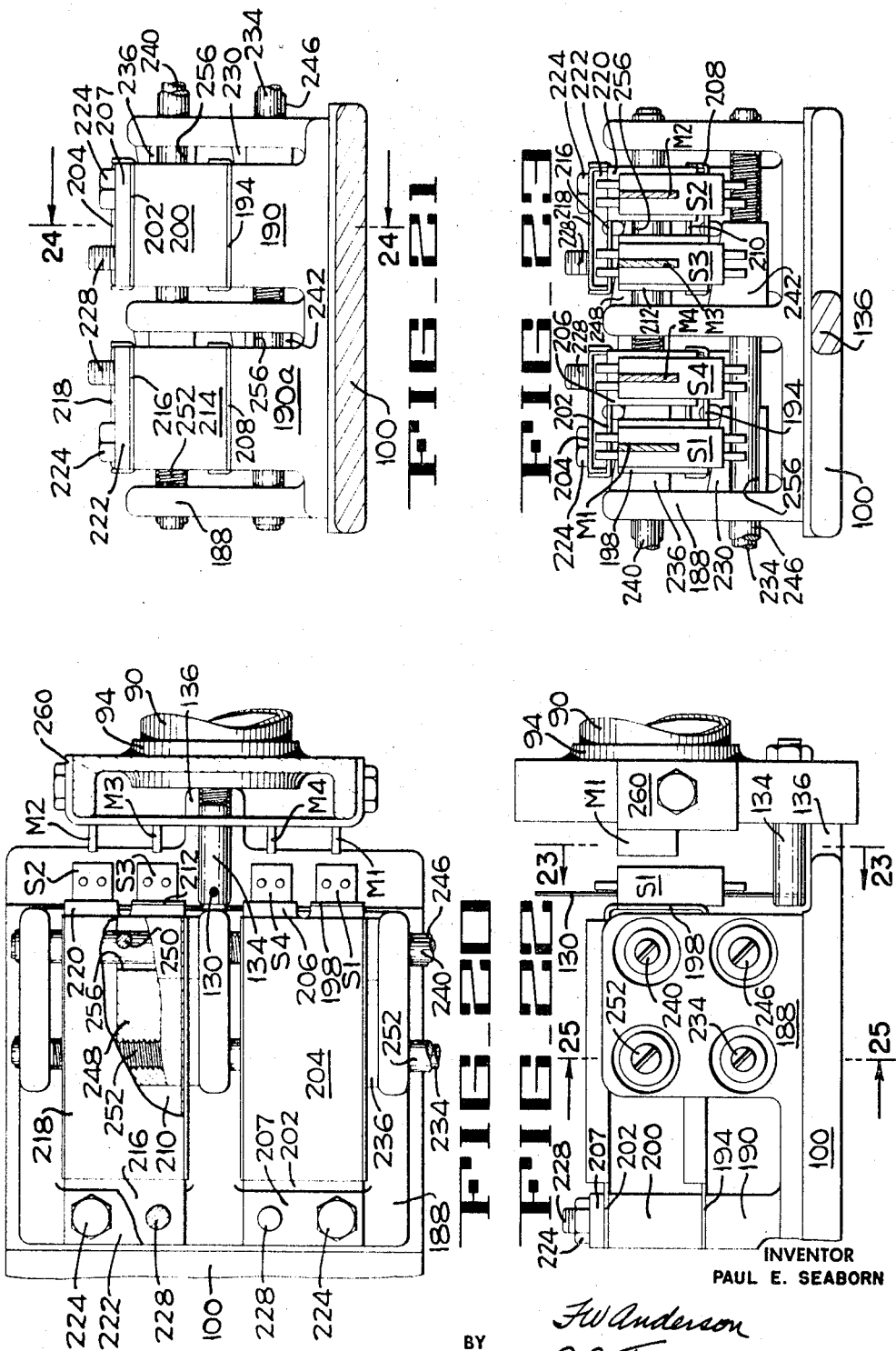

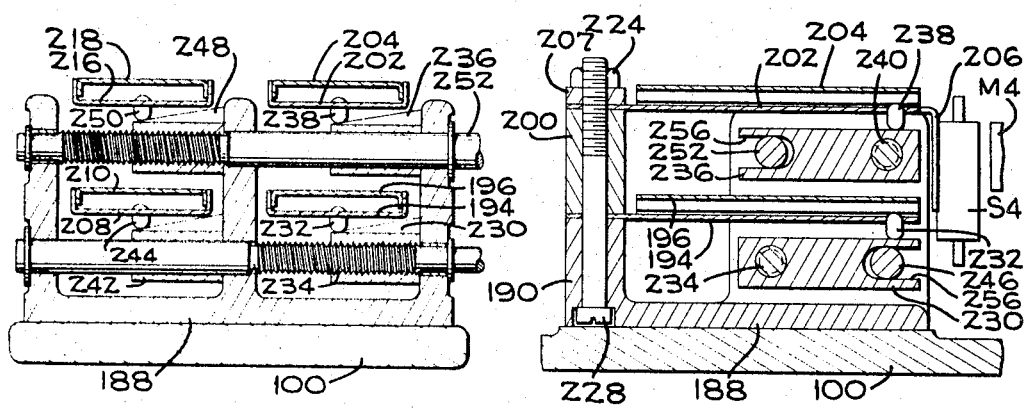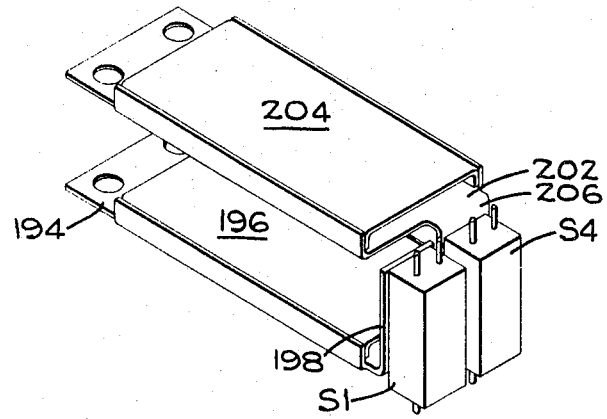

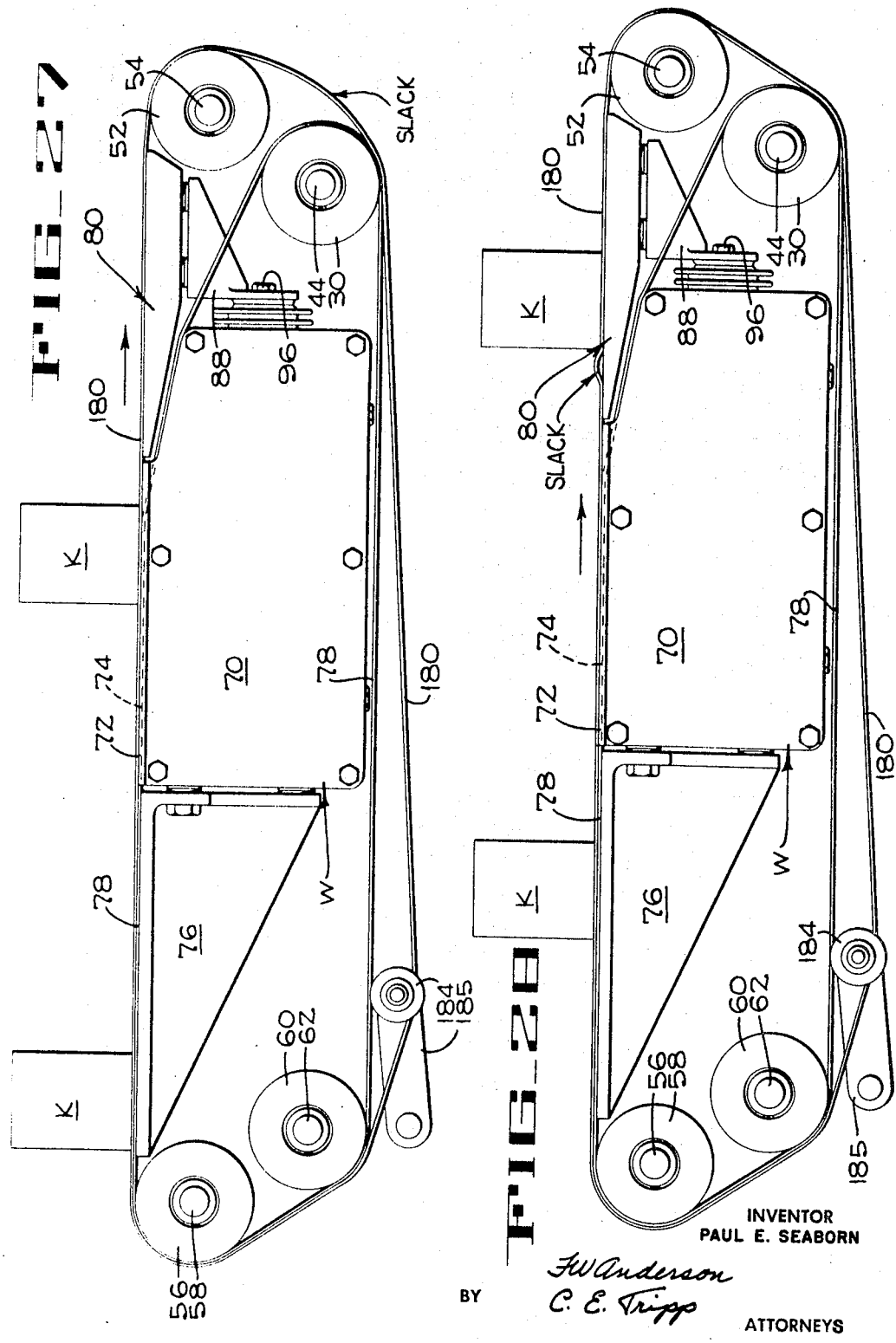

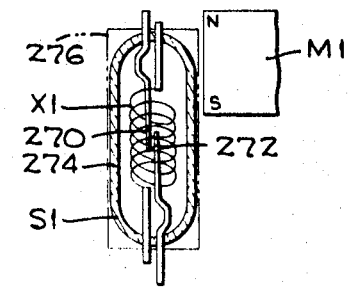
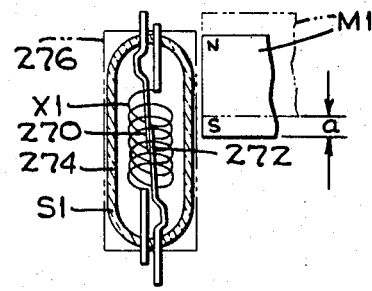
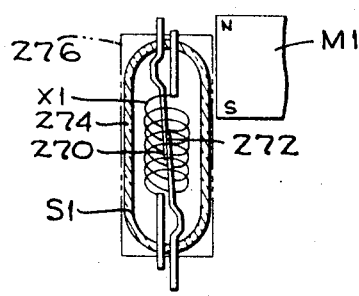
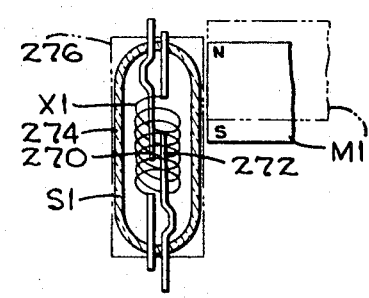
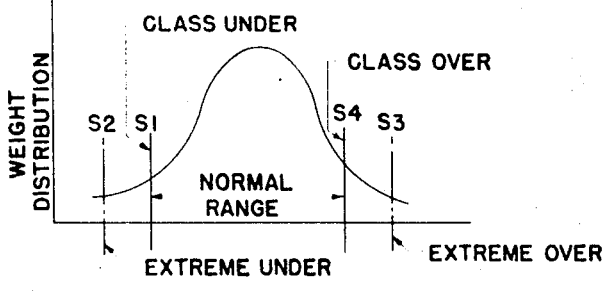

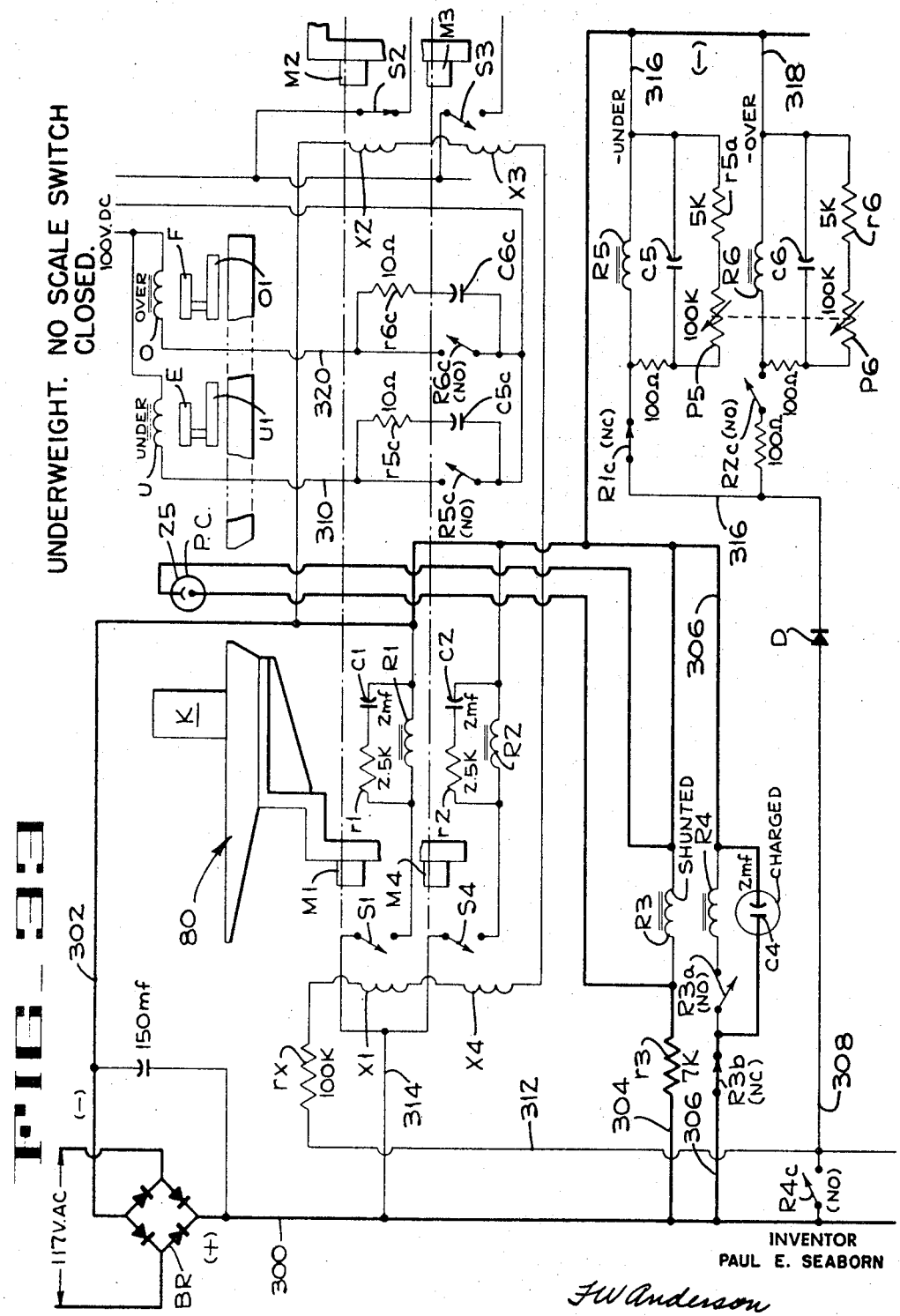

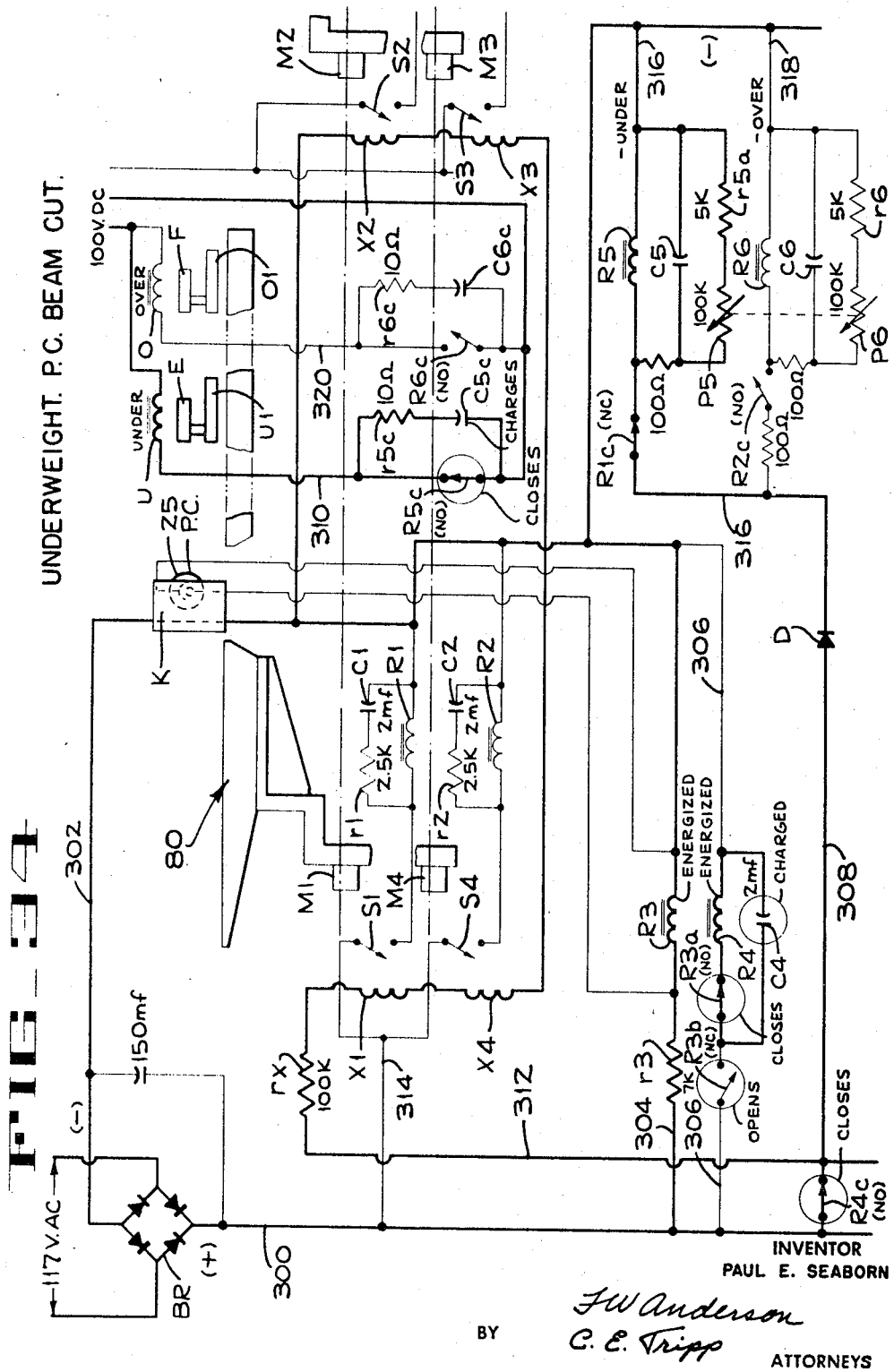

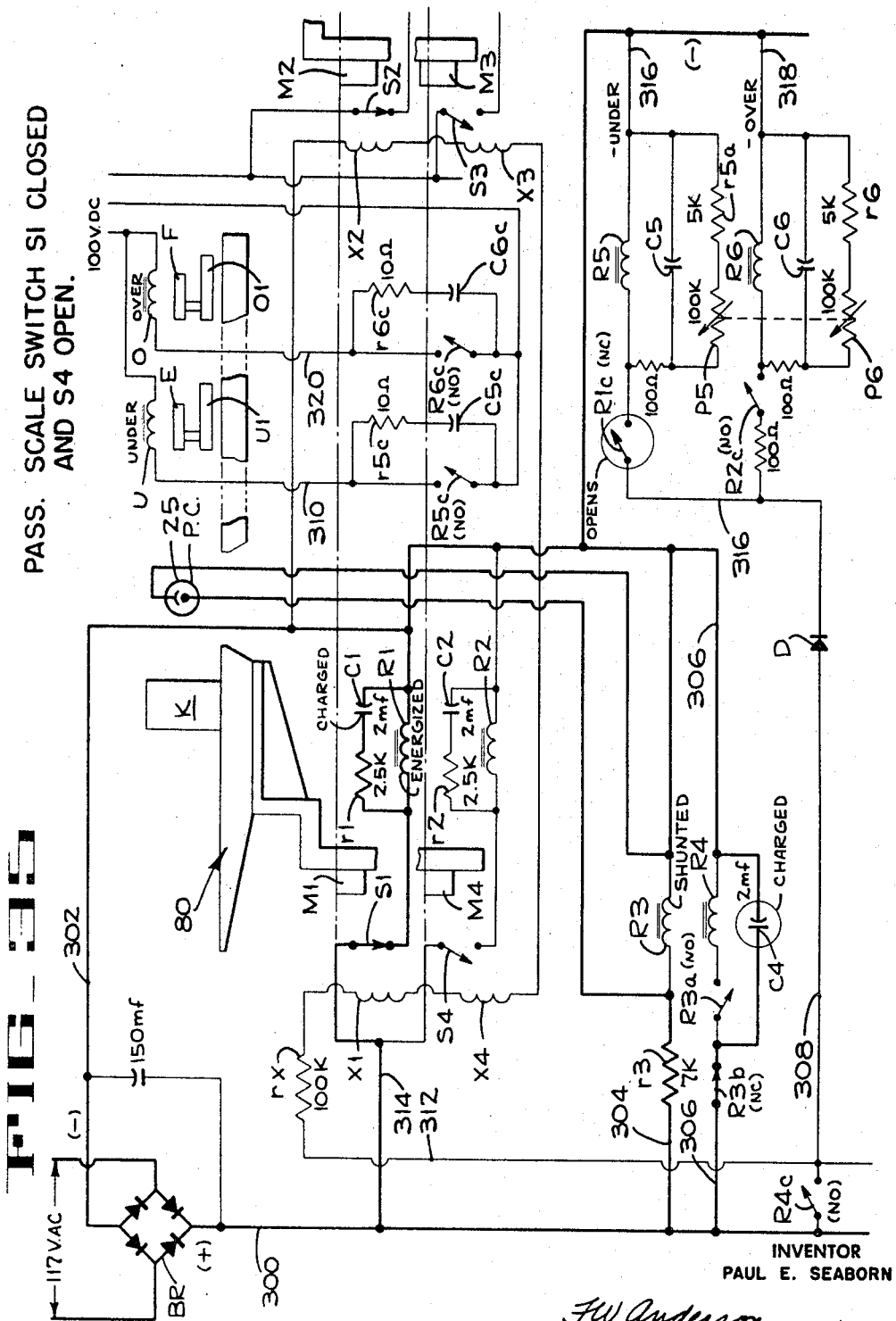

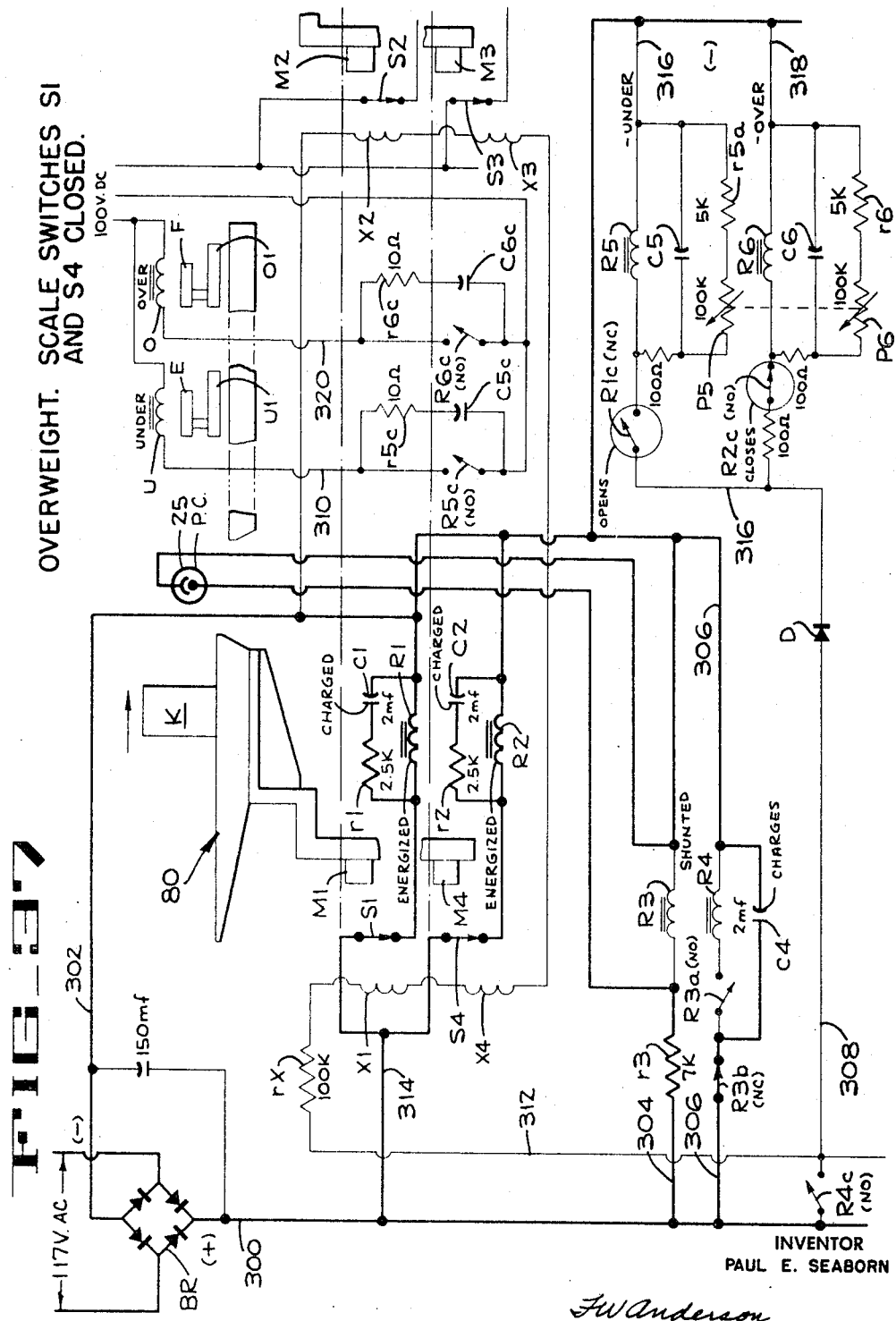

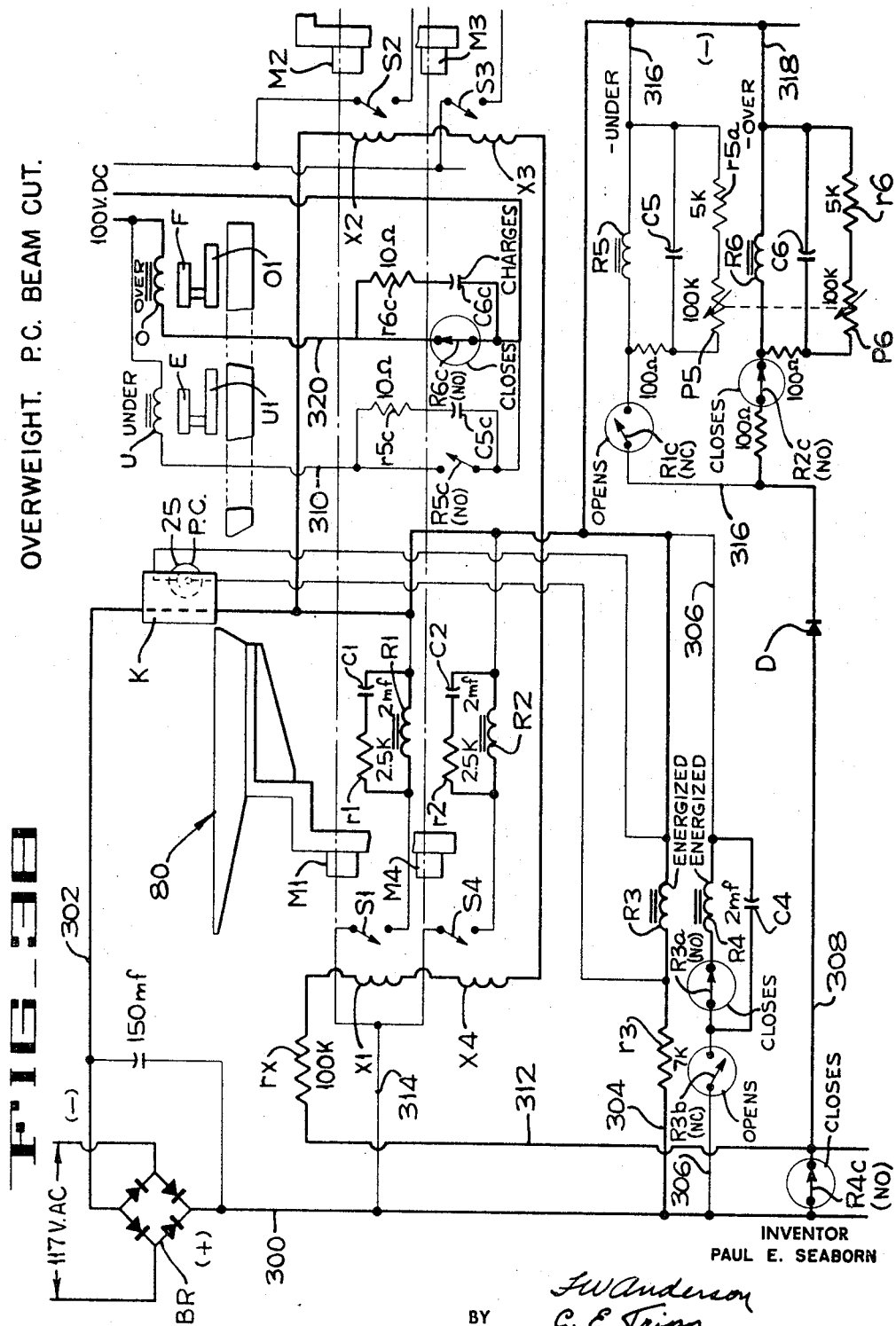

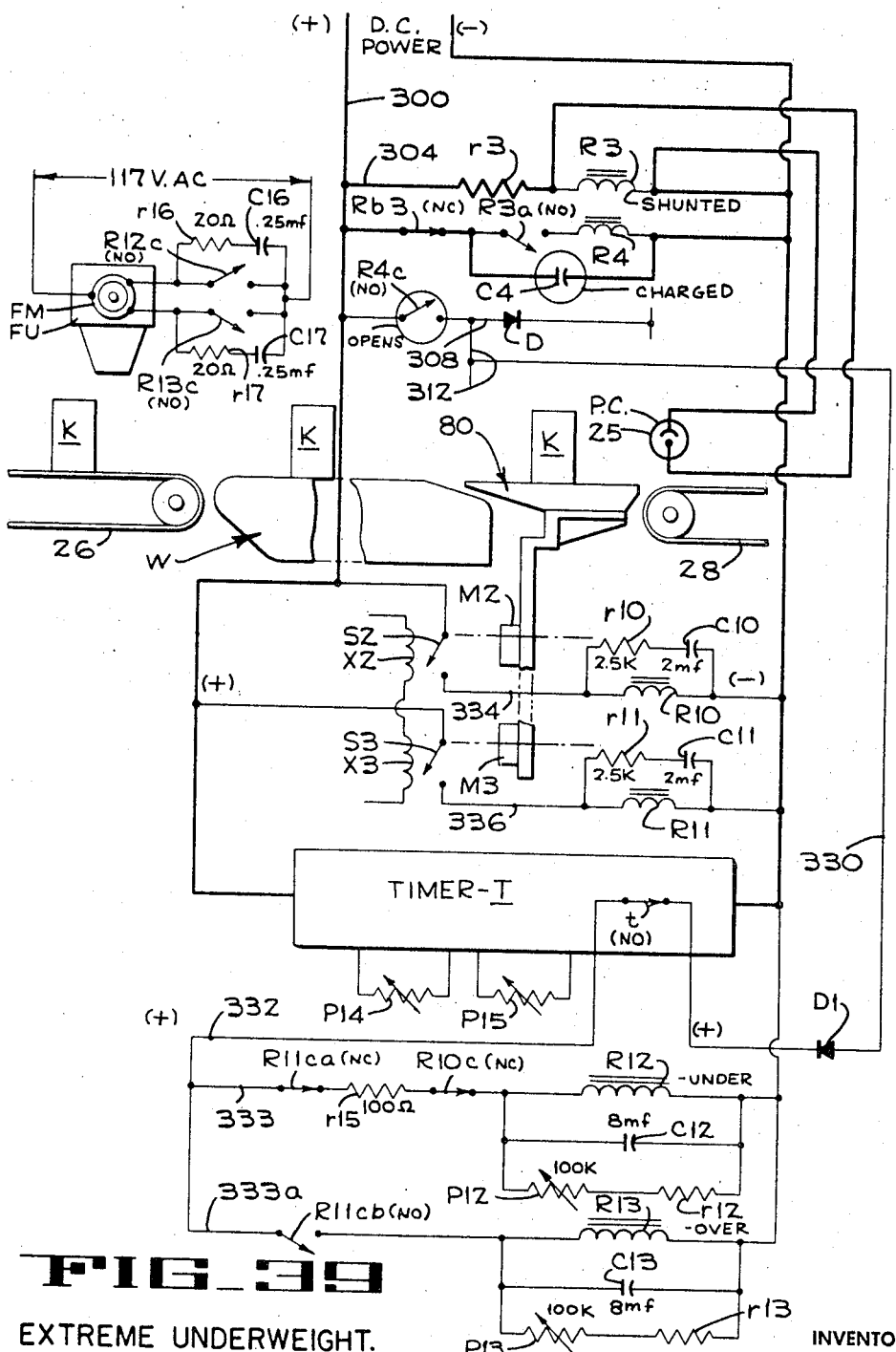
FIG_39
EXTREME UNDERWEIGHT.
NEITHER FILL CONTROL
SWITCH CLOSES.

EXTREME UNDERWEIGHT.
P.C. BEAM CUT.

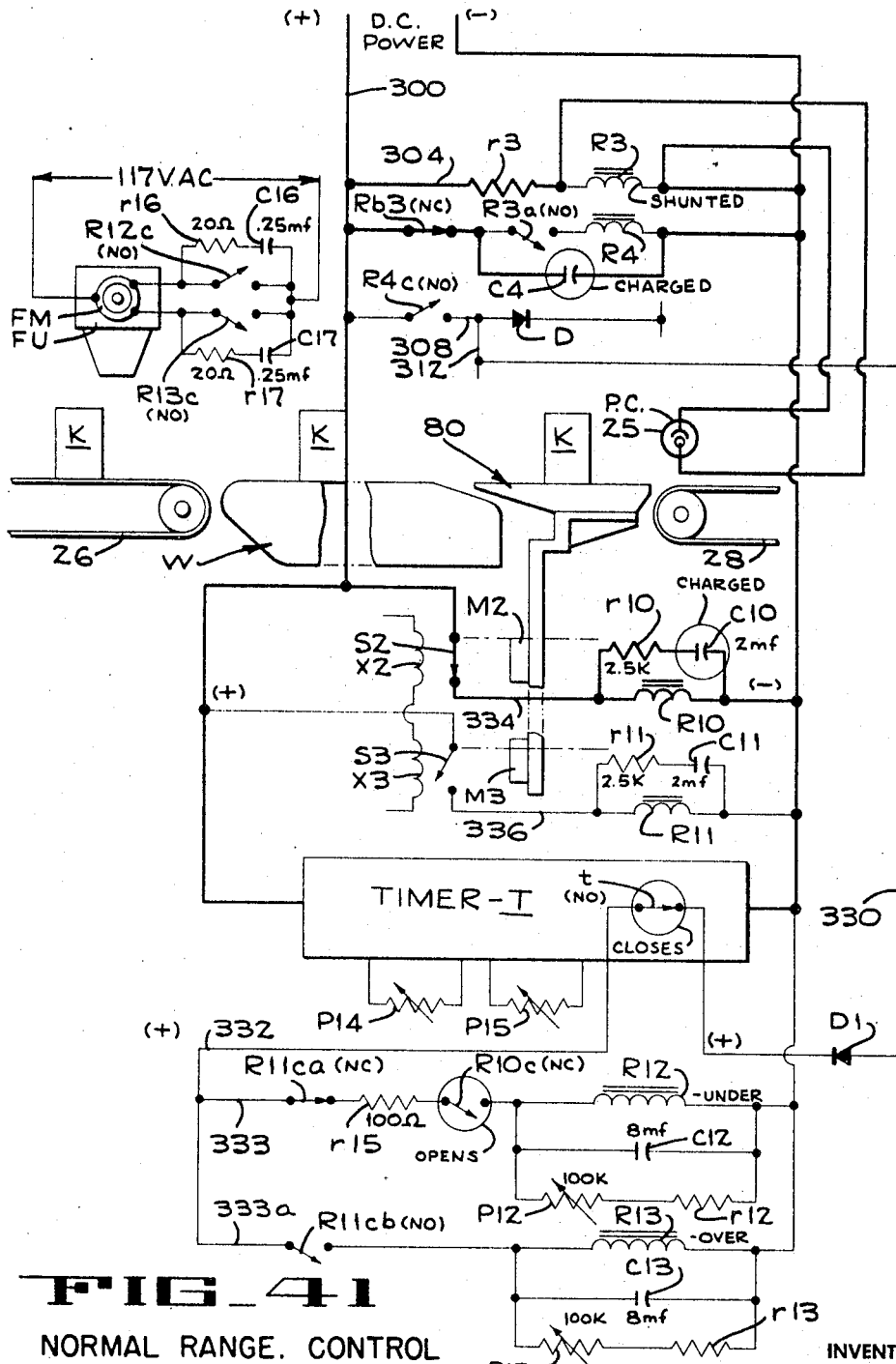
FIG_41
NORMAL RANGE. CONTROL
SWITCH S2 CLOSES.

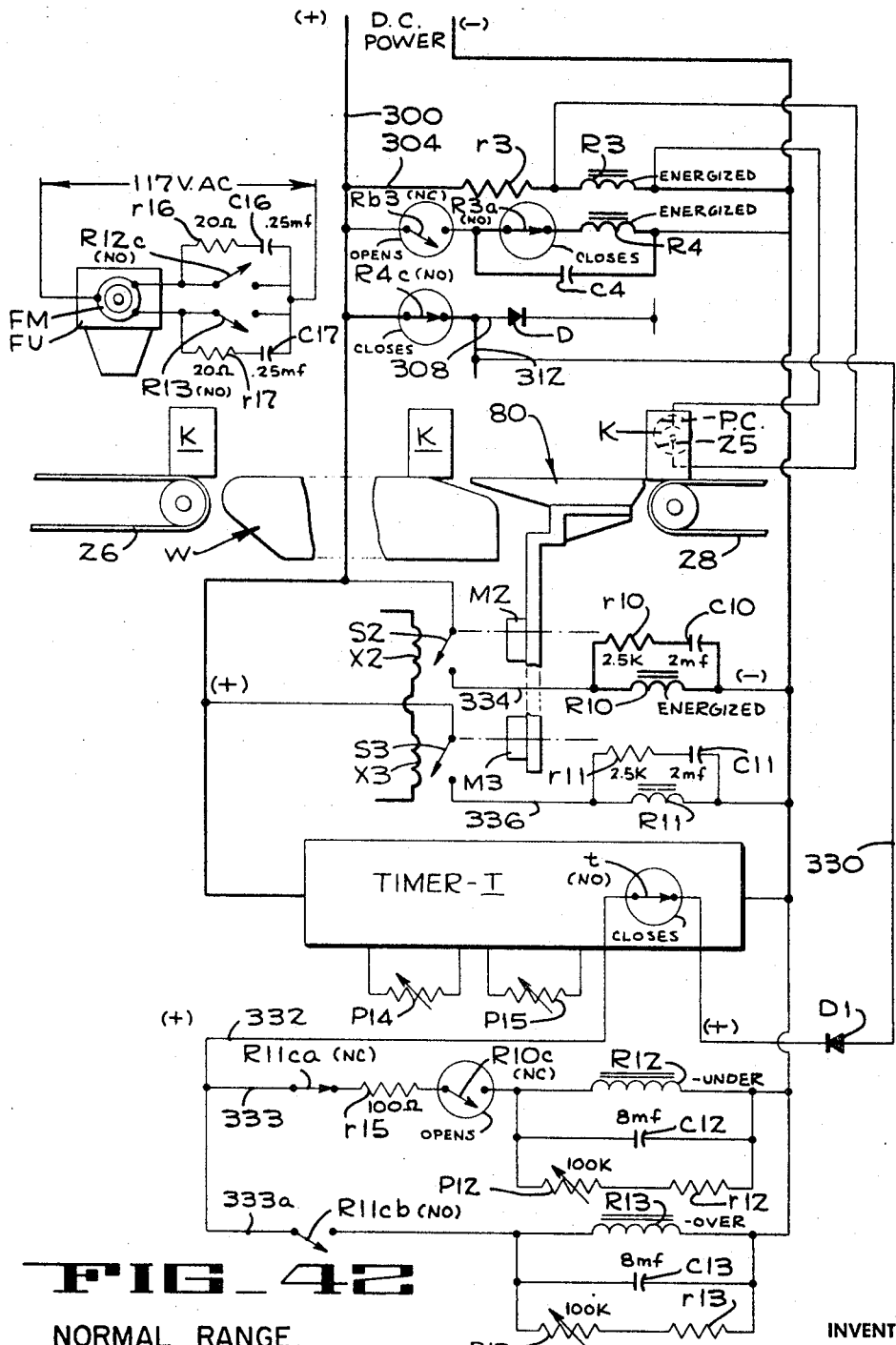

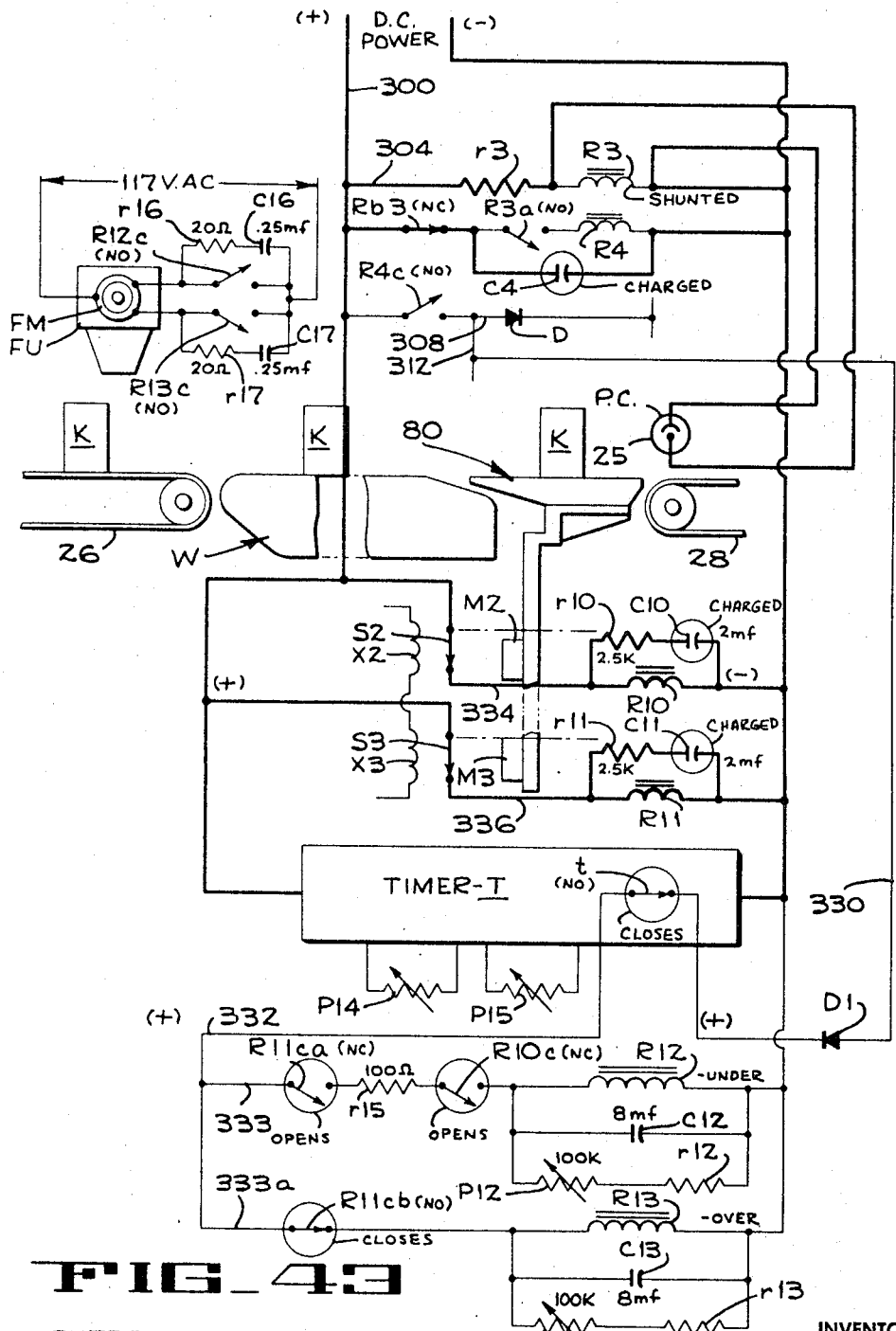
FIG_43
EXTREME OVERWEIGHT.
CONTROL SWITCHES
S2 AND S3 CLOSE.

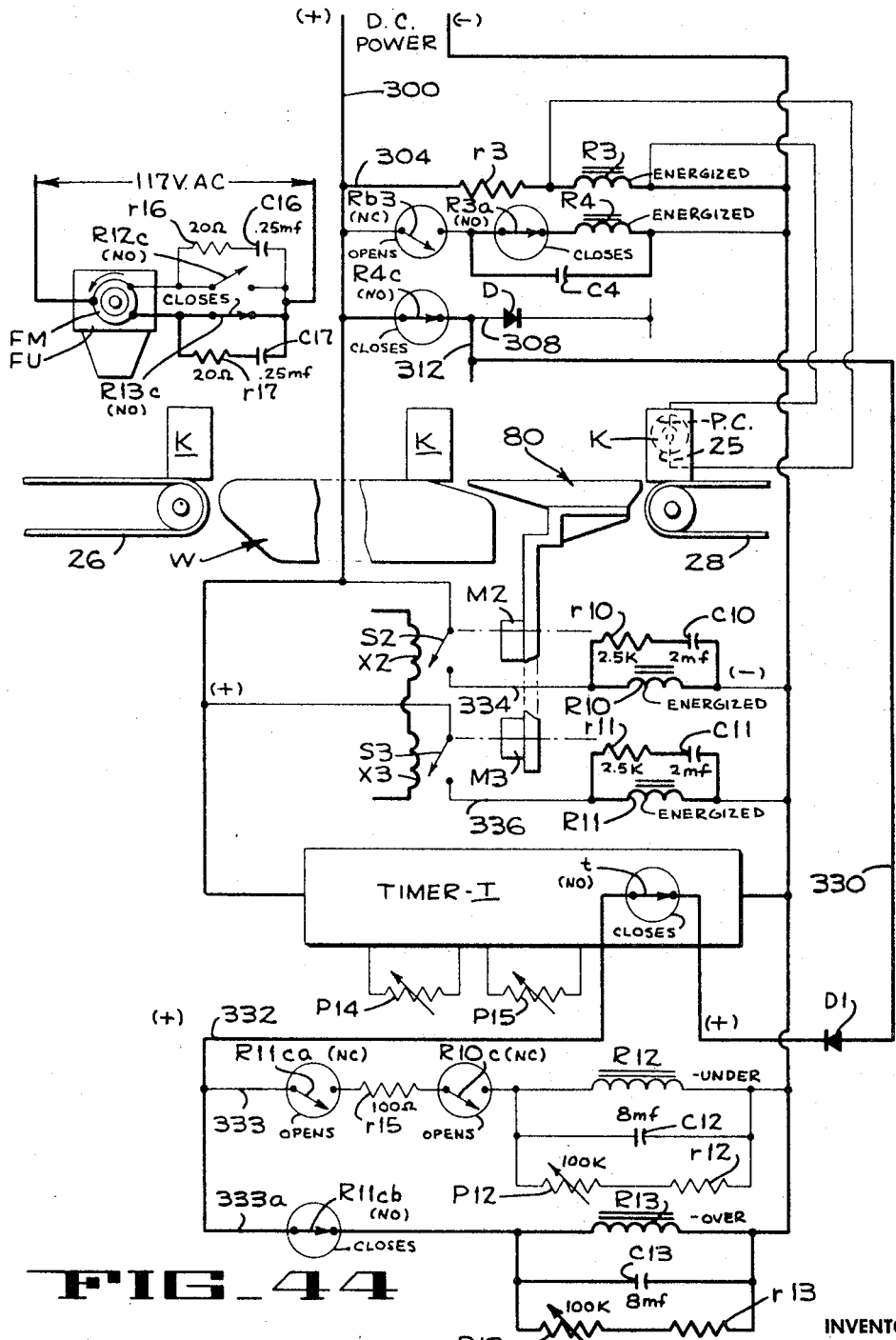
FIG_44
EXTREME OVERWEIGHT.
P.C. BEAM CUT.

United States Patent Office 3,451,549
Patented June 24, 1969

3,451,549
AUTOMATIC WEIGHING AND FILL CONTROL APPARATUS
Paul E. Seaborn, Los Gatos, Calif., assignor to FMC Corporation, San Jose, Calif., a corporation of Delaware
Original application Aug. 12, 1963, Ser. No. 301,498, now Patent No. 3,367,433, dated Feb. 6, 1968. Divided and this application Mar. 10, 1967, Ser. No. 656,606
Int. Cl. B07c *5/16;* B07b *13/08*
U.S. Cl. 209—121         8 Claims

ABSTRACT OF THE DISCLOSURE

In a conveyor type checkweigher, the position of a spring loaded scale platform is sensed by a vertical array of reed switches operated by magnets on the platform, for giving digital readings of the weight of articles on the platform.

---

This application is a divisional application of my copending application No. 301,498, filed Aug. 12, 1963, now U.S. Patent No. 3,367,433, dated Feb. 6, 1968.

This invention relates to the automatic classifying and the sorting of articles by weight, and includes the automatic control of a filler or dispensing device which fills cans, packages or the like prior to their being weighed.

Automatic weighing devices of the type described, and to which this invention relates, are often referred to as checkweighers. The device of the present invention is a checkweigher, and operates continuously and automatically. It passes or accepts articles within a certain weight range, by permitting the articles to pass freely through the apparatus. It rejects underweight articles by deflecting them along one path, and rejects overweight articles by deflecting them along another path. As mentioned, in addition to this function, the complete system of the present invention controls a fill correction motor, in accordance with weight samples taken periodically.

It is an object of the present invention to provide a checkweigher or weight classification circuit which does not require the use of continuously variable transducers, control transformers, or the like but which operates digitally (on an off-on basis) both for a weighing, classifying or sorting function, and for a package fill control function of the apparatus.

Another object of the invention is to provide a checkweigher circuit of the type described, wherein the scale platform level sensing devices are of a digital nature as described, yet operate at precisely controllable levels, and which levels do not vary in service and are readily adjustable from without the scale housing for varying the acceptance range of the articles.

It is also an object of the invention to provide a scale platform level sensing assembly and circuitry that employs classifying and fill control switches of the magnetically operated reed type.

A further object is to provide a level sensing assembly of the type described, wherein the classifying switches can be reset and hence readied for reception of a new article on the scale platform, before the scale platform has fully returned to its uppermost, article receiving level. This permits high speed operation of the unit.

Another object of the invention is to provide a classification and fill control circuits that take advantage of the digital (off-on) operation of the magnetically operated reed switches, and provides precise control, which circuit is simple, fool proof and dependable.

Still another object is to provide classification and fill control circuits which store the article weight information in a simple manner, and can use this information for classifying after the scale platform has been partially or fully returned to its upper level, or normal article receiving position.

It is an object of the present invention to provide a classifying and fill control assembly and circuits, wherein the normal underweight-overweight reject range is readily adjustable, as is a separate underweight-overweight fill control range.

Another object is to ensure that previously corrected articles reach the scale platform before new weight correction signals are generated.

The manner in which these and other objects of the present invention may be attained by those skilled in the art, will be apparent from the following detailed description of the invention.

In the drawings:
FIGURE 1 is an end elevation of the input or article receiving end of the apparatus.
FIGURE 2 is a rear elevation of the apparatus, showing the scale belt drive.
FIGURE 3 is a front elevation of the apparatus.
FIGURE 4 is a section taken on lines 4—4 of FIGURE 1, with parts broken away to further illustrate the scale belt drive.
FIGURE 5 is a fragmentary transverse section of the approach platform, one of the transport belts, and the weigh belt, drawn on an enlarged scale.
FIGURE 6 is a plan of the apparatus, with the cover for the belt drive housing removed.
FIGURE 7 is a section taken on lines 7—7 of FIGURE 6 with the belt broken away.
FIGURE 8 is a section taken on lines 8—8 of FIGURE 3, showing the scale belt driving roller.
FIGURE 9 is a partial vertical section taken on lines 9—9 of FIGURE 3, showing the scale belt drive motor and assembly.
FIGURE 10 is a fragmentary vertical section taken on lines 10—10 of FIGURE 3.
FIGURE 11 is a fragmentary horizontal section taken on lines 11—11 of FIGURE 2, showing the belt take-up for the scale roller drive assembly.
FIGURE 12 is a fragmentary vertical section through the scale assembly.
FIGURE 12A is an enlarged fragmentary view of the scale assembly, like the view of FIGURE 12.
FIGURE 12B is a fragmentary enlarged side elevation of the upper cantilever spring that locates the scale platform.
FIGURE 13 is a fragmentary horizontal section of the scale assembly, taken on lines 13—13 of FIGURE 12.
FIGURE 13A is an enlarged fragmentary horizontal section taken on lines 13A—13A of FIGURE 12A.
FIGURE 14 is a fragmentary vertical section, taken on lines 14—14 of FIIGURE 12.
FIGURE 15 is a vertical section, taken on lines 15—15 of FIGURE 12.
FIGURE 16 is a vertical section, taken on lines 16—16 of FIGURE 12.
FIGURE 17 is a section through the switch assembly, taken on line 17—17 of FIGURE 12.
FIGURE 18 is a section taken on lines 18—18 of FIGURE 12 showing the scale platform and magnets for operating the switches.
FIGURE 19 is a section showing the end of the scale platform assembly, taken on lines 19—19 of FIGURE 12.
FIGURE 20 is a plan of the magnet and switch mechanism, taken on lines 20—20 of FIGURE 12A.
FIGURE 21 is an end elevation of the forward, or spring mounting end of the switch assembly.
FIGURE 22 is a side elevation of the switch and magnet assembly.
FIGURE 23 is an end elevation of the delivery or switch end of the switch assembly, taken on lines 23—23 of FIGURE 22. The magnets mounted on the scale platform are sectioned in this view.

FIGURE 24 is a section of the switch mechanism, taken on lines 24—24 of FIGURE 21.

FIGURE 25 is a section of the switch mechanism, taken on lines 25—25 of FIGURE 22.

FIGURE 26 is a perspective of two switch elements, with the other parts of the switch assembly omitted.

FIGURE 27 is a diagram of the scale assembly, showing the condition of the weigh belt when articles are on the approach platform, but no articles are on the scale platform.

FIGURE 28 is a similar diagram, showing the condition of the weighing belt when an article is being moved across the scale platform, and another article is on the scale assembly, approaching the scale platform.

FIGURE 29 is a diagrammatic sectional showing of one of the four magnetically operated reed switches, employed in both the classifying and the fill control circuits.

FIGURE 30 is a diagram like FIGURE 29, with the reed switch having been closed by a partial lowering of a scale platform magnet. FIGURE 30A is like FIG. 30 showing the reed switch closed, even though the magnet has been raised.

FIGURE 31 is a similar diagram, wherein the reed switch has been opened by a reset coil, even though the scale platform magnet has not returned to its uppermost level, or article receiving position.

FIGURE 32 is a diagram showing typical article reject and fill control points, that can be set up for operating the checkweigher of the present invention.

FIGURE 33 is the first of six schematic diagrams of the weighing and classification circuit. In this diagram an underweight article is being weighed on the scale platform.

FIGURE 34 is a diagram like that of FIGURE 33, showing the circuit when the photocell beam is cut by the underweight article that has been weighed.

FIGURE 35 is a diagram showing an article being weighed that is within accepable weight limits.

FIGURE 36 is a diagram showing the same acceptable article cutting the photocell beam.

FIGURE 37 is a diagram showing an overweight article being weighed.

FIGURE 38 is a diagram showing the same overweight article cutting the photocell beam.

FIGURE 39 is a first of a series of six schematic circuit diagrams of the fill control circuit. In this figure, an extreme underweight article is being weighed.

FIGURE 41 is the diagram showing an article within the normal weight range being weighed.

FIGURE 42 is a diagram showing the same article within the normal weight range cutting the photocell beam. The fill control unit is not activated.

FIGURE 43 is a diagram showing an extreme overweight article being weighed.

FIGURE 44 is a diagram showing the same extreme overweight article cutting the photocell beam, causing a decrease in the fill rate by the fill control unit.

GENERAL ARRANGEMENT

Figure 40:
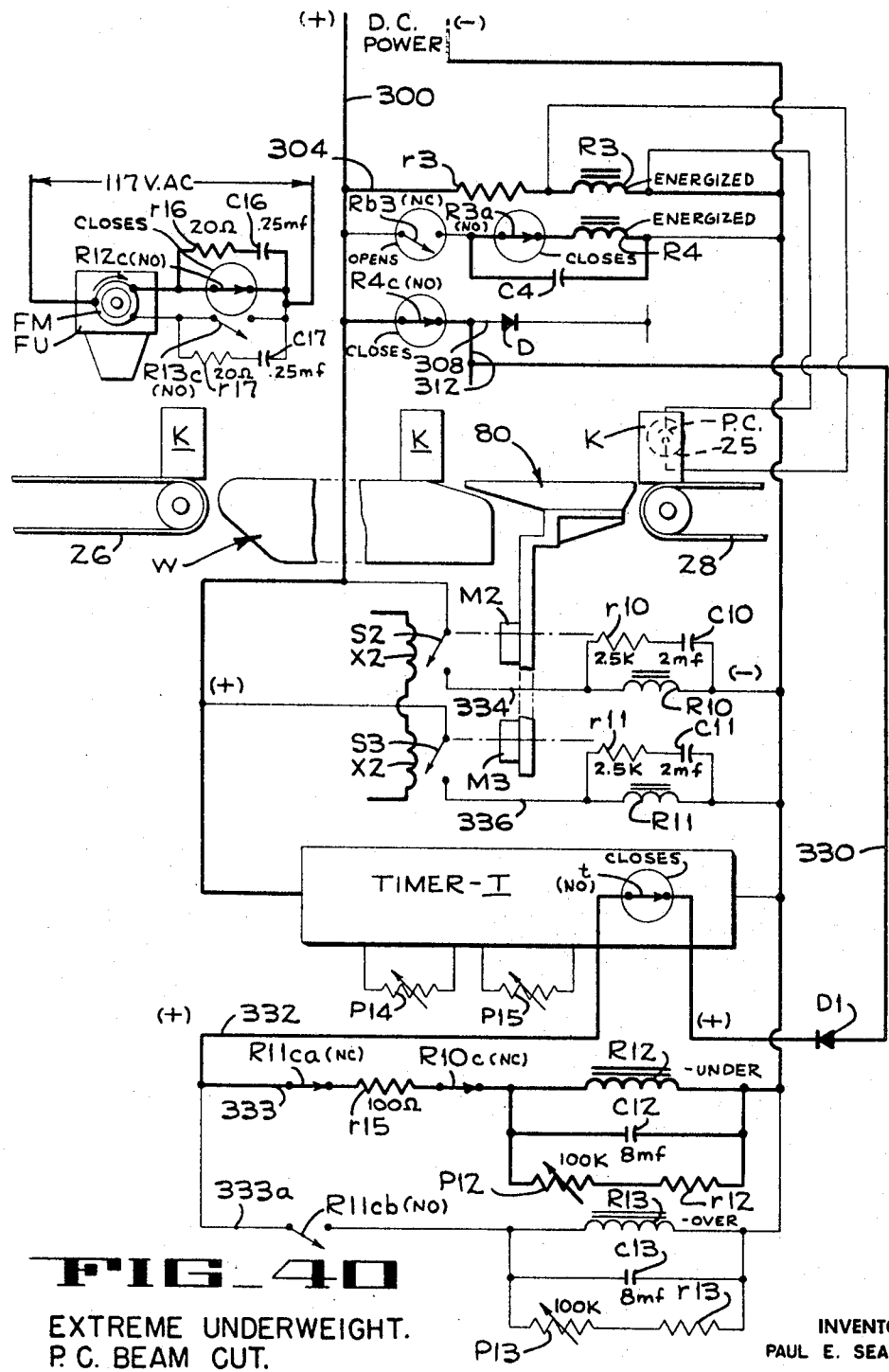
FIGURE 40 is a diagram showing the same extreme underweight article cutting the photocell beam, causing an increase in the fill rate by the fill control unit.

The general arrangement of the automatic weighing apparatus of the present invention is best seen in FIGURES 1–7 and 15, to which reference will now be made. The weighing device of the present invention includes a drive housing assembly indicated generally at H, and a weighing or scale assembly indicated generally at W. The drive housing assembly H is supported on a pedestal 10, and three posts 11 (FIGURES 6 and 15) project horizontally from the drive housing assembly H. These posts mount the weighing or scale assembly W in cantilever fashion. As seen in FIGURES 2 and 3, a cabinet 12 is mounted on the upper portion of the drive housing assembly H, which cabinet houses the electrical circuitry. On the front of the cabinet (FIG. 3) is an off-on switch 14, an underweight indicator lamp 16, an overweight indicator lamp 18, a preload spring adjustment knob 20, and a preload spring adjustment counter or indicator 22.

As best seen in FIGURES 3 and 6, a photocell unit indicated generally at P.C. is mounted adjacent the rearward or delivery end of the weighing or scale assembly W. This unit includes a photocell activating lamp 24 (FIGURES 3, 6 and 12) as well as the photocell itself, indicated at 25, FIGURE 7. The photocell 25 is of the photo-resistive type, and a mounting tube 25a contains the wires for the cell.

As seen in FIGURE 3, a feed or delivery conveyor 26, the construction of which forms no part of the present invention, is mounted at the forward or input end of the weighing or scale assembly W. Although the details of the take-away conveyor also form no part of the present invention, this conveyor includes an underweight article deflector arm E, and an overweight article deflector arm F illustrated in the circuit diagrams of FIGURES 33–38. These deflector arms are operated by rotary solenoids, as will be explained. The construction of a combined slide take-away and deflector assembly that also serves the function of the take-away conveyor 28, and which is suitable for use with the weighing apparatus of the present invention, is disclosed and claimed in the copending application of Paul Seaborn, now Patent No. 3,367,433, and assigned to the assignee of the present application. As mentioned, the underweight and overweight deflectors E and F are of the rotary solenoid operated type, although the details of their construction are not critical to the present invention.

THE TRANSPORT AND WEIGH BELT DRIVE

In the apparatus of the present invention, transport belts are provided to carry cans, packages, or other articles to be weighed and segregated across an approach platform to the scale platform, and weigh belts carry the articles across the scale platform, in a manner to be described in detail presently.

Both sets of belts (transport and weigh belts) are driven by a scale belt drive roller 30, seen in FIGURES 3, 8 and 12. The speed reducing belt drive mechanism for the drive roller 30 is mounted in the drive housing H. This mechanism includes a drive motor 32 (FIGURES 1, 2 and 6), the shaft of which mounts a pulley 34. A countershaft 36 is rotatably mounted in the drive housing H, and a large pulley 38 is mounted on the countershaft 36. A timing belt 40 passes over the pulleys 34 and 38. A small pulley 42 is mounted on the shaft 36. A shaft 44 for the drive roller 30 is also rotatably mounted in the housing H. A large pulley 46 is mounted on the drive roller shaft 44. A V-belt 48 passes over the pulleys 42 and 46. A belt tightener 50 is provided for the belt 48 as best seen in FIGURES 2, 6 and 11.

As previously described, there is a weighing or scale assembly W, which is mounted in cantilever fashion from the drive housing H. Referring to FIGURES 3 and 12, the drive roller 30, which drives the transport and weighing belts, has been previously referred to. There is also a weigh belt pull roller 52, which is mounted on a shaft 54, and as best seen in FIGURE 8, shaft 54 is rotatably mounted in the drive housing H. At the input end of the scale assembly is a pair of idler rollers, including an upper idler roller 56 mounted on a shaft 58, as best seen in FIG. 4. A lower idler roller 60 is supported on a mounting shaft 62 by means of an eccentrically mounted shaft 64, as best seen in FIGURE 10. The shaft 62 can be clamped in adjusted position by means of a clamp bolt 66, for adjusting the tension on the transport belts.

THE SCALE ASSEMBLY

Various details of the scale assembly W will now be described. The scale assembly includes a main housing 70, to which is fastened a top plate 72, which plate forms an approach platform. The approach platform or plate 72 is grooved as at 74, and projecting from the approach platform is an approach plate extension 76, shown in FIGURES 3 and 12. The transport belts are indicated at 78, and these belts ride in the grooves 74 formed in the approach platform 72. The transport belts pass around the drive roller 30, previously referred to, and around the idler rollers 56 and 60. A typical operating linear speed for the transport belts is 248 ft./min.

It is desirable that the scale platform be rigid but of light weight, in order to reduce the inertia of the scale platform, and improve the high speed operation of the scale. Such a scale platform is shown at 80 in FIGURES 12 and 12A. The body of the platform is formed of rigid polystyrene foam. This foam body is covered with a fiber glass cover 84, having low friction, long wearing characteristics. A mounting stud 86 is embedded in the foam body 82. This assembly provides a very lightweight but rigid scale platform construction.

The scale platform 80 is mounted on combined preload and weighing spring means (to be described) within the main scale housing 70 of scale W. This mounting of the scale platform is by means of a bracket 88, which depends from the stud 86, and which is straddled by the two inner transport belts 78, as best seen in FIGURE 19. Referring to FIG. 12A, the bracket 88 is clamped to a horizontally extending bracket mounting sleeve 90, which sleeve extends through an aperture 92 formed in the end wall of the scale housing 70. The inner end of the sleeve 90 is clamped to a mounting plate 94, the bracket 88, sleeve 90 and plate 94 all being joined by a single clamp bolt 96.

SPRING ASSEMBLIES

In order to mount the spring assemblies, as well as the preload spring adjusting gearing and the scale switch assembly, a sub-frame 100 is mounted within the main scale housing 70.

The scale platform 80 is restrained from horizontal motion, but is permitted to freely partake of vertical motion, by means of upper and lower cantilever springs 102. The cantilever springs 102 appear in FIGURE 12A, in FIGURE 12B in enlarged form, in FIGURE 18, and in other figures. The inner ends of the cantilever springs 102 are mounted on the sub-frame 100 by means of clamp plates 104, (FIGURE 12A) and a clamp bolt 106. The outer ends of the cantilever springs 102 are mounted on the scale platform plate 94, by clamp plates 108 and clamp bolts 110. As best seen in the enlarged view of FIGURE 12B, grooves 112 are formed adjacent each end of each cantilever spring 102, these grooves being adjacent the clamp plates 104 and 108, respectively. The grooves 112 in the cantilever springs accommodate vertical motion of the scale platform, yet the grooves are narrow enough so that the base metal of the grooves does not buckle and the cantilever springs accurately locate the scale platform 80 in the horizontal direction. To give typical dimensions, with a cantilever spring 102 that is 1/16" thick the grooves 112 would be 1/4" wide and the thickness of the cantilever spring at the base of the grooves would be 0.007" thick. The springs are formed of a chrome-nickel steel which has a high fatigue resistance and low temperature expansion coefficient characteristics.

As best seen in FIGURES 12, 12A, 13 and 17 combined weighing and preload spring 120 is also provided in the main scale housing 70, which spring vertically supports the scale platform 80. Because of the grooves 112 formed in the cantilever springs 102, the springs 102 offer very little or negligible resistance to vertical motion of the scale platform. In order to equalize the stresses along the preload spring 120, the spring is triangular, as seen in the plan of FIGURE 13. This triangular shape also minimizes the inertia of the preload spring, and reduces oscillations thereof in high speed operation.

PRELOAD SPRING MOUNTING AND ADJUSTMENT

Means the provided to adjust the upward force exerted by the preload spring against the scale platform, while the latter is prevented from moving upwardly by a stop. To attain this action, a shaft 122 (FIGURES 12A and 15) is mounted in the sub-frame 100. The base or large end of the triangular preload spring 120 is clamped to the shaft 122 by means of a clamp plate 124 and bolts 126. The scale platform 80 is suspended from the apex or narrow end of the preload spring 120 by a suspension wire 130, which wire is mounted on the apex of the preload spring by nuts 132, and a threaded stud 133 that is soldered to the wire 130. The lower end of the suspension wire 130 is soldered to a post 134 that projects from the scale plate 94. Post 134 also acts as a stop to define the lowermost position of the scale platform, by engaging the base of the subframe 100.

The preload spring 120 urges the scale platform 80 upwardly, so that normally a stop ear 136, which projects forwardly from the base of the sub-frame 100, is engaged by a flange 137 of the scale platform mounting plate 94.

As mentioned, means are provided to adjust the force with which the preload spring 120 urges the stop flange 137 of the scale platform plate against the top ear 136. This adjustment determines the minimum articles weight which will being to deflect the scale platform, and as will be seen, any article that does not move the scale platform off of its upper stop (136, 137), is an underweight article, and in the setting of the apparatus to be described, even an article that deflects the scale platform slightly, may be rejected as an underweight article.

The preload spring adjustment is effected by means of reduction gears which provide a very fine, or verner adjustment. Referring to FIGURES 12A and 16, a sector gear arm 140 depends from the preload spring clamp shaft 122. A laterally extending preload spring manual adjustment shaft 142 is rotatably mounted in the sub-frame 100, and extends into the drive housing H, as will be explained presently. A gear 144 is fixed on the preload spring adjustment shaft 142. A countershaft 146 is also pivotally mounted in the sub-frame 100. As seen in FIGURES 12, 12A and 13 a gear 148 is fixed on the countershaft 146, and meshes with the gear 144 that is fixed on the adjustment shaft 142. As seen in FIGURES 12A and 13A a small pinion 150 is connected to the countershaft gear 148. As seen in FIGURES 13A and 16, a large gear 152 is rotatably mounted on the manual adjustment shaft 142, and large gear 152 meshes with the small pinion 150 on the countershaft 146.

As seen in FIGURES 13A and 16, a small pinion 154 is connected to the freely rotatable large gear 152. A large gear 156 is rotatable on the countershaft 146 and is meshed with the pinion 154 on the large gear 152, FIGURES 13A and 15. A small pinion 158 is connected to the freely rotatable large gear 156. A large gear 160 is freely rotatable on the manual adjustment shaft 142, and meshes with the small countershaft pinion 158, FIGURES 13A and 16. A small pinion 162 is connected to the freely rotatable large gear 160 on the manual adjustment shaft. A large gear 164 is freely rotatable on the countershaft 146, and is meshed with the small pinion 162, FIGURES 13A and 15. A small pinion 166 is connected to the large gear 164, FIGURE 13A, and as seen in this figure the pinion 166 meshes with a large gear 168 that is freely rotatable on the manual adjustment shaft 142. A medium size gear 170 is attached to the large gear 168, and it is the medium size gear 170 that meshes with the sector gear arm 140 for the preload spring, as best seen in FIGURES 12A and 16.

As seen in FIGURES 3 and 15, in order to provide for convenient adjustment of the preload vernier drive just described, a lower sprocket 172 is mounted on the inner end of the manual adjustment shaft 142, within the drive housing H. As seen in FIGURES 3 and 6, a countershaft 173 is rotatable within the drive housing H and this countershaft mounts an upper sprocket 174. A chain 176 connects these sprockets. The countershaft 173 is turned by the vernier adjusting knob 20 (FIG. 3) previously described, for manual adjustment of the preload spring. As seen in FIGURE 6, an adjustment counter bevel gear 178 is also mounted on the knob shaft 173, which bevel gear meshes with a bevel gear 179 for driving the adjustment indicator counter (FIG. 3) 22 previously referred to. The preload spring 120, which supports substantially the entire weight of articles on the scale platform during the weighing operation, is formed of a chrome-nickel steel for high resistance, and for maintaining a constant spring rate over a range of temperatures.

THE WEIGH BELT

As seen in FIGURE 12 and other figures, the weigh belt is indicated at 180. The weigh belt is formed of thin, strong, low friction material such as a fluoro-ethylene polymer. The weigh belt 180 rests on the transport belts 78 at the approach platform 72. As mentioned, and as illustrated in the enlarged view of FIGURE 5, the approach platform 72 is grooved at 74 to receive the transport belts 78, but the transport belts are enough thicker than the depth of the grooves 74 to support the weigh belt 180 along the length of the approach platform 72. The weigh belt then passes over the scale platform 80, around the weigh belt pull roller 52, around the belt drive roller 30 (at which roller the weigh belt again overlies the transport belts), and around the lower and upper idler rollers 60 and 56, whereupon the weigh belt extends across the approach platform extension 76 and runs onto the approach platform 72.

Means are provided to tension the weigh belt for smooth operation. As seen in FIGURES 3, 10 and 12, a weigh belt tension roller 184 is provided which roller is mounted on a rearwardly extending mounting arm 185. Mounting arm 185 is pivotally mounted in the drive housing H, FIGURE 10, and the roller tensions the weigh belt by means of the weight of the roller and arm assembly.

SWITCH AND MAGNET ASSEMBLY

The digital switch and magnet assembly, which are important in the present invention, will now be explained. The assembly includes four normally stationary, but adjustable, reed switches S1–S4 and four magnets M1–M4 mounted on the scale platform for closing their respective switches. The pertinent figures are FIGURES 12, 12A, 17, 18 and 20 to 26. In order to mount the switches, a switch mounting frame indicated generally at 188 is mounted on the base of the subframe 100. The frame 188 includes a vertically extending mounting plate 190 for mounting a lower cantilever switch mounting spring 194 for the switch S1. The construction of the switches and the circuits employed will be described presently. As best seen in FIG. 26, a stiffener channel 196 is formed along the cantilever switch mounting spring 194. As best seen in FIGURES 23 and 26, a bent up tongue 198 is provided at the outer or free end of spring 194, to which the switch S1 is bonded. As seen in FIGURE 21, a spacer block 200 is provided above the vertical plate 190 for clamping the inner end of the cantilever spring 194.

At the upper end of the spacer block 200 is another cantilever mounting spring 202 which spring mounts the switch S4. As seen in FIG. 6, a stiffener channel 204 is also provided along the cantilever spring 202. The switch mounting spring 202 has a bent down tongue 206, to which the switch S4 is bonded, as seen in FIGURES 23 and 26. As seen in FIGURE 21, a clamp plate 207 is provided for clamping the spring 202 against the spacer block 200.

Similar means are provided for mounting switches S3 and S2. Referring to FIGURES 21, 22 and 25, a cantilever spring 208 mounts the switch S3, which spring has a stiffener channel 210, and a bent up tongue 212 for mounting the switch. A vertical plate 190a supports the inner end of the cantilever spring 208, which plate 190a projects upwardly from the switch mounting frame 188, as does companion plate 190, previously described.

A spacer block 214 is secured above the spring 208, which block supports the inner end of a cantilever spring 216, for mounting the switch S2. As seen in FIG. 23, the spring 216 also has a stiffener channel 218, and a bent down tongue 220, for mounting the switch S2. As seen in FIGURES 21–22 a clamp plate 222 clamps these parts together. As seen in FIGURE 21, there are switch assembly mounting bolts 224 for mounting the switch assembly on the sub-frame 100, and which also serve as clamp bolts for the spacer blocks and springs. Also provided are clamp bolts 228, which extend upwardly from the bottom of the frame 188.

The means for adjusting the vertical position of the four switches will now be described. This adjustment is necessary in order to provide the control, or cut-off points for the operation of the automatic scale. The adjustment is made by means of a screw mounted wedge provided for each of the four switches, the screws being accessible from the front of the scale housing assembly W (FIG. 3).

As seen in FIGURE 25, in order to adjust switch S1, an adjusting wedge block 230 is provided for the spring 194. The tapered upper surface of this block engages a button 232 that projects downwardly from the cantilever spring 194 that mounts the switch S1. In order to laterally adjust the wedge block 230, an adjusting screw 234 is provided, which screw is threaded into the wedge block. Similarly, a wedge block 236 is provided for adjusting the spring 202 of the switch S4 (FIGURES 20 and 25), which block engages a button 238 on the spring 202 for the switch. The adjusting screw for the switch S4 is indicated at 240.

As soon in FIGURE 25, a wedge block 242 is provided for adjusting the spring 208 of switch S3. This wedge block engages a button 244 depending from the spring 208, and is operated by an adjusting screw 246.

A wedge block 248 adjusts the spring 216, FIGURE 25, in order to vertically adjust the switch S3. The button for this spring is indicated at 250, and is engaged by the wedge block 248. As seen in FIG. 24, the adjusting screw for the wedge block 248 and switch S3 is indicated at 252, and the screw 252 is threaded into the wedge block 248. As is also seen in FIGURE 24, the wedge blocks are slotted as at 256, to permit the adjusting screws that are not threaded to the blocks, but which adjust other blocks, to pass through the slots in the blocks, without affecting the positions of such blocks.

As previously mentioned the switches S1–S4 are reed switches, which are closed by permanent magnets M1–M4, mounted on the scale platform. In the broader aspects of the invention this mounting arrangement could be reversed, with the switches on the scale platform and with the permanent magnets mounted in the scale housing.

As has been described, the reed switches are vertically adjustable on the scale assembly. Since it is only the relative vertical position of the switches and magnets that is critical, in the broader aspects of the invention, either the switches or the magnets can be vertically adjustable. The preferred form is that shown, wherein the switches are adjustably mounted in the scale housing. This minimizes the mass of the scale platform, and eliminates the need for bringing lead wires out of the moving scale platform.

In order to mount the permanent magnets M1–M4 on the scale platform, a strap 260 is mounted on the plate 94 of the scale platform assembly, which strap is best seen in FIGURES 20 and 22. The permanent magnet bars M1–M4 for operating the switches S1–S4, respectively, project horizontally from the strap 260. As has been described, with the switch construction of the switch mounting elements shown, each switch can be individually vertically adjusted, to determine which switches are closed and which are not closed for any given depression of the scale platform from its uppermost, or article receiving level. The significance of this adjustment, and the classifying and fill control circuits will be explained in detail, after this description of the mechanical portions of the scale assembly has been completed.

ISOLATION OF APPROACHING ARTICLES

As has been previously mentioned, it is a feature of the present invention that when an article such as a package or can is being weighed on the scale platform, articles approaching this sacle platform are virtually insulated from the portion of the weigh belt that carries the articles across the scale platform. This reduces oscillation, and facilitates rapid weighing. The position of the driving roller 30 in this design, below the weigh belt pull roller 52 is also of importance. Referring to FIGURE 27, which is a semi-schematic diagram in that all elements do not appear, and the condition of the weigh belt is exaggerated, a can K is seen on the approach platform 72, and another can is seen entering the platform extension 76. However, no can is on the scale platform 80. Under these conditions the driving roller 30 is advancing both cans solely by means of the transport belts 78, and the weigh belt 180 is only loaded enough to carry it across the scale platform 80. This means that, as indicated in the diagram of FIGURE 27, the slack in the weigh belt will predominantly occur between the weigh belt pull roller 52, and the driving roller 30. The slack appears between rollers 52 and 30, because under the conditions of FIG. 27, the weigh belt is virtually "pushed" across the scale platform by the transport belts.

However, as indicated in diagram of FIG. 28, when a can K is advanced to the scale platform 80, the weigh belt 180 must now be tensioned by the driving roller 30 to assume the load of the individual can on the scale platform, as it pulls the can across the platform. However, the transport belts "push" the weigh belt across the approach platform 72, so that now the slack in the weigh belt is taken up between the can on the scale platform and the approaching can on the approach platform 72, as indicated schematically in the diagram of FIGURE 28. This position of the slack in the weigh belt isolates that portion of the weigh belt that is on the scale platform, from the remainder of the weigh belt that is supporting cans advancing toward the scale platform. This design has the various advantages and features previously described in the opening remarks of this specification, namely, the effect of the weigh belt on the article being weighed is minimized. These features, coupled with the triangular nature of the preload spring 120, all contribute toward rapid, precise operation of the scale, as does the use of magnetically operated reed switches, which provide a digital definitive control circuit information.

THE REED SWITCHES

Before discussing the control circuits, the nature of the reed switches employed will be described in connection with FIGURES 29–31, which figures are largely diagrammatic. Although the use of such switches is important to the invention, the exact details of the internal construction thereof are not part of the invention. Typical switches suitable for use with the present invention are manufactured by Hamlin Incorporated in Lake Mills, Wis. This company refers to these switches as being "miniature magnetic reed switches."

As seen in FIGURES 29–31 each reed switch (switch S1 being illustrated although all are alike) includes paramagnetic, gold plated reed contact strips 270, 272 projecting inwardly from each end of a glass envelope 274. The ends of these contacts are normally spaced slightly, as illustrated in FIGURE 29, so that the switch is normally open. In order to protect the glass envelope 274, it is encapsuled in a molded plastic capsule 276.

There is a reset coil for each of the switches, and these coils are indicated at X1–X4, respectively, reset coil X1 being provided for the switch S1 under description. The reset coil is shown as surrounding the reed contact strips directly, although it could also be wound around the outside of the glass envelope 274.

This switch assembly operates as follows: In FIGURE 29 the magnet M1 is in its uppermost position relative to switch S1, and the reed contacts 270–272 are open. However, magnetic lines of force are passing between the north and south poles of the magnet M1, through the switch contacts, and across the contact gap. The magnet M1 is not lowered far enough to cause a sufficient number of magnetic lines of force to pass through the switch contacts to close the contacts.

In FIGURE 30, the magnet M1 has been moved downwardly slightly (distance $a$) by depression of the scale platform. This motion is sufficient to close the switch S1. Closure of the switch is caused by the more perfect distribution of the magnetic lines of force through the reed contacts, causing the contacts to snap together. The disance $a$ which represents the difference between an upper position of the magnet M1 that leaves the switch S1 open, and a lower position that closes the switch, can be very small, in fact, it may be as small as 0.0005″. This indicates delicacy of control which the digital operation of the system provides.

In FIGURE 30A the scale platform has returned the magnet to its uppermost position, but the switch blades or strips remain in contact, due to the fact that once closed, they present a lower reluctance magnetic path for the magnetic lines of force emanating from the magnet, than when they are open.

In FIGURE 31, the reset coil X1 has been energized. This converts the reset coil into an electro-magnet of opposite polarity to the permanent magnet M1, and hence causes the switch S1 to open. Thus it can be seen that the switches provide a signal storage device, and that once they are closed by depression of the scale platform by an article being weighed, they will remain closed even though the scale platform returns to its upper level, after the article has been weighed.

CONTROL POINTS

FIGURE 32 shows a weight distribution curve for a typical set of control points that determine operational limits. When extremely underweight articles are being weighted, the scale platform is not depressed from its upper stops, and no switches are closed, including the extreme underweight fill control switch S2. As will be seen, this causes the fill control circuit to increase the filling rate, and the underweight reject deflector E to be energized.

When an article is being weighed that has a somewhat higher weight, but the weight of which is still too small to render the article acceptable, the scale platform will leave its upper stops, and will be depressed sufficiently to close the underweight fill control switch S2, but neither classification switch S1 or S4 will close, nor will the overweight fill control switch S3 close. As will be seen, this causes this article to be deflected by the underweight deflector E, for eventual reject, but the fill control unit is not activated.

Normally, most articles will lie between a weight that is slightly heavier than the underweight reject weight, and a weight that is slightly lighter than the overweight reject weight. Such articles are acceptable, and they will close the underweight fill control switch S2 and the classification switch S1. The weights of these articles fall in accordance with statistical laws, as indicated by the weight distribution curve of FIGURE 32. As mentioned, under these conditions, the article is passed, and the fill control unit is not activated.

When an article that is overweight sufficiently to represent release of an excessive amount of the product but which article is not sufficiently overweight to call for a fill rate correction, the scale platform will descend sufficiently to first close the underweight fill control switch S2, then the underweight classification switch S1 is closed, and finally the scale platform will descend sufficiently to close the overweight classification switch S4. The extreme overweight fill control switch S3 remains open. This overweight article will be deflected by the overweight deflector arm F, but the fill control unit will not be activated. In order to prevent over-correcion tthere is a sampling timer in the circuit, which will be explained presently.

When an article of extreme overweight is presented to the scale platform, all four scale switches are closed, including the extreme overweight fill control switch S3, which has heretofore not been closed. As will be seen, this gives a signal to the fill control circuit to decrease the filling rate, and the article is deflected by the overweight deflector arm F.

THE CLASSIFICATION CIRCUIT

The control circuits will now be described. These circuits include a classification circuit or system, and a fill control circuit or system. As mentioned, the classification circuit is controlled by the classification reed switches S1 and S4, and their corresponding magnets M1 and M4, whereas the fill control circuit is controlled by the fill control switches S2 and S3, and their magnets M2 and M3. This is a purely arbitrary switch designation. Due to the adjustment features previously described, any switch can be made to assume any desired function in the system.

In the drawings that follows, twelve figures (33–44) are presented to illustrate the classifying and fill control circuits. Of these twelve figures, six figures (33–38) represent operation of the classifying circuit. Of these six figures, there are three pairs of diagrams, too (FIGS. 33 and 34) for the underweight deflection operation, two (FIGS. 35 and 36) for the pass operation, and two (FIGS. 37 and 38) for the overweight deflection operation. These six figures will now be described in detail.

UNDERWEIGHT ARTICLES

The circuit of FIGURE 33 will now be discussed. The 117-volt AC connects to a bridge rectifier BR, from which runs a B+ line 300, and a B— line 302. In the description that follows, only the leads or lines necessary to understand the circuit will be described and given reference numerals. As mentioned, when an underweight article such as the can K is on the scale platform 80, the preload spring 120 will have been adjusted so that neither classification switch S1 nor switch S4 will be closed by their respective magnets M1 and M4, and no circuits through these classification switches are energized.

However, the photocell 25 of the photocell unit P.C. always receives voltage from the power supply because it is connected across the B+ and the B— leads 300, 302 through a branch B+ line 304, and a 7,000-ohm resistor r3. A relay coil R3 is also in the branch B+ in line 304, but since the photocell has a low resistance when the can K is being weighed, that is when the photocell unit light beam is uninterrupted (as in the case in FIGURE 33) the photocell effectively shunts out the relay coil R3, and that coil is not energized. Below line 304 in the diagram of FIG. 33, is a branch B+ line 306, that is also connected across the DC supply. When relay coil R3 is shunted out by the photocell, a normally closed contact R3b in the branch B+ line 306 will be closed, but a normally open contact R3a that is also in line 306 will be open. Under these conditions, a relay coil R4 in line 306 is not energized, but a condenser C4, which is shunted across the relay coil R4, and the contact R3a adjacent the relay coil R4, will be charged through line 306. Since the relay coil R4 is thus prevented from being energized by contact R3a, the normally open contact R4c, in a line 308 connected to B+, will remain open. As will be seen, under these conditions none of the classifying circuits will operate when the photocell beam is cut.

Referring to FIGURE 34, the can K has eclipsed the light beam of the photocell unit P.C. This increases the resistance of the photocell 25, so that the relay coil R3 in the branch B+ line 304 is no longer shunted out by the photocell, and hence relay R3 becomes energized. When relay coil R3 is energized, its normally closed contact R3b in the branch B+ line 306 opens, but its normally open contact R3a, that follows contact R3b in line 306 closes. Closing of normally open contact R3a shunts the previously charged capacitor C4 across the otherwise de-energized relay coil R4, and relay coil R4 is momentarily energized by the capacitor C4, for a length of time depending upon the RC constants of the circuit.

Since relay coil R4 is now energized, its normally open contact R4c in line 308 connected to B+ now closes, and directs current through a diode D to a branch B+ line 316, through a normally closed contact R1c (which remains closed because the underweight article has not closed the classification scale switch S1), and into an underweight reject relay coil R5. Simultaneously a charging capacitor C5 that is connected across relay coil R5 is being charged.

As seen in FIGS. 33 and 34, there is an underweight reject rotary solenoid coil U, and a deflector blade armature U1 for coil U, which armature projects the deflector blade E. One side of the underweight deflector solenoid coil U is connected directly to one side of the 100-volt DC line. The other side of the underweight solenoid coil U connects by means of a line 310 to a normally open contact R5c. It is to be understood that the details of the actual reject device are not part of the invention.

As previously described before the photocell beam was cut (FIG. 33), normally open contact R4c in line 308 was open, and relay coil R5 in branch B+ line 316 was de-energized. When the beam is cut (FIG 34) relay coil R4 is momentarily energized by capacitor C4 through normally open contact R3a (now closed), normally open contact R4c closes, and the underweight relay coil R5 is energized. Normally open contact R5c now closes, and the circuit of D.C. line 310 is completed through the solenoid coil U of the underweight reject deflector. This operates armature U1 to move the deflector blade E into position for deflecting the article as it leaves the scale platform.

As noted, relay R5 is shunted by a condenser C5. This stores the information that an underweight article has passed across the scale platform, even though relay R4 becomes de-energized by discharge of its shunt condenser C4. The time during which this information is stored at the underweight reject relay coil R5 is adjusted by a 500,000-ohm potentiometer P5, that is connected in series with a 5,000-ohm resistor R5a across the condenser C5. Potentiometer P5 is set so that the underweight deflector solenoid U will remain energized while the package passes from the photocell to the underweight deflector blade E. In order to reduce contact arcing a ca-capacitor c5c is shunted across the contact R5c in the DC line 310, in series with a 10-ohm resistor r5c.

This simple weight storage information characteristic of the present circuit insures dependable operation, and does not require precise timing and positioning of the parts for very rapid, high speed weighing. As can also be seen in FIGURE 34, when the photocell beam of unit P.C. is cut, and when normally open switch contact R4c closes, a line 312 leading from switch contact R4c is energized. This energizes all of the switch reset coils X1, X2, X3 and X4 through a 100,000-ohm resistor rx. However, since neither of the classification switches S1 or S4 has been closed, energization of the switch reset coils X1 and X4 has no effect on the circuit.

ACCEPTABLE ARTICLES

Referring to FIGURE 35, when an article, such as a can K that is within acceptable weight conditions, that is one which is to be passed, is on the scale platform, the scale platform is deflected from its upper stops sufficiently to cause magnet M1 to close the classifying scale switch S1. As mentioned, the extreme underweight fill control switch S2 will also close, but the effect of this on the fill control circuit will be explained later. Classification switch S1 is connected to a line 314 leading from the B+ line 300, and since switch S1 is now closed, it energizes a relay coil R1 that follows scale switch S1 in the branch B+ line 314. Simultaneously, a capacitor C1 that shunts the relay coil R1 through a 2,500-ohm resistor r1, is charged. Conditions in the remainder of the circuit are like those of FIG. 33, previously described, in that the photocell shunts out relay coil R3, and the capacitor C4 for relay coil R4 is being charged. However, since relay coil R1 is now energized by scale switch S1, its normally closed contact R1c, which is in the branch B+ line 316 connected to the diode D now opens. The other scale switches S3 and S4 are not affected by closure of the underweight classification switch S1, by an article within the acceptable weight limits.

Referring now to FIG. 36, the acceptable article has now interrupted the photocell beam, and the resistance of the photocell has increased so that relay coil R3 is no longer shunted out by the photocell. Thus relay coil R3 is now energized through the line 304 and the 7,000-ohm resistor r3.

Energization of relay coil R3 by the acceptable article, opens the normally closed contact R3b in the branch B+ line 306, and closes the normally open contact R3a that follows contact R3b, in the same line. Now the previously charged capacitor C4, which is shunted across the relay coil R4, energizes the relay coil R4. This closes the normally open contact R4c in the branch B+ line 308 as before, but nothing happens because normally closed contact R1c in the branch line 316 ahead of the relay coil R1 is held open by the previously charged capacitor C1, which is shunted across the relay coil R1.

Since the classification switch S4 has not closed, the relay coil R2 is not energized, and a switch R2c in a line 318 leading to diode D remains open. Thus neither the underweight reject relay coil R5, nor the overweight reject relay coil R6 are energized. As before, when the photocell beam is cut, all reset coils X1–X4 are energized to reopen the switches S1 and S2, as previously described.

OVERWEIGHT ARTICLES

FIGURE 37 shows the classifying circuit during the period when an overweight article is being weighed. Under these circumstances, the scale beam is deflected sufficiently so that both classifying scale switches S1 and S4 are closed. The underweight fill control switch S2 will also be closed, and the overweight fill control switch S3 may or may not be closed, depending upon to what degree the article is overweight.

With the classifying switch S1 closed, the line 314 leading from the B+ line 300 energizes the relay coil R1, as well as the relay coil R2, and also charges the associated shunting condensers C1 and C2.

Continuing with FIGURE 37, relay coil R3 in line 304 is shunted out by the photocell as before, and condenser C4 in line 306 that is connected to B+ line 300 for energizing relay coil R4 is being charged as before. Relay coil R4 is again deenergized as before. This is because with relay coil R1 energized due to closing of the scale switch S1 by the overweight article, normally closed contact R1c in the branch B+ line 316 opens, but this makes no difference because normally open contact R4c in line 308 that connects to the B+ line 300 ahead of branch B+ line 316 remains open. Contact R4c remains open because relay coil R4 is prevented from being energized by normally open contact R3a in line 306, which contact remains open because relay coil R3 is shunted out by the photocell during weighing, as mentioned above.

Continuing further with FIGURE 37, since classifying switch S4 is also closed by the overweight article, relay coil R2 is also energized, which closes a normally open contact R2c in another branch B+ line 318, for directing B+ to the overweight relay coil R6. However, the closing of normally open contacts R2c in branch B+ line 318 has no effect, because as previously mentioned, normally open contact R4c in line 308 that connects to the B+ line 300 ahead of the branch B+ line 318 remains open. Thus, no current can reach either the underweight or the overweight relay coils R5 and R6, respectively, when an overweight article is being weighed.

Referring now to FIGURE 38, the can K has cut the beam of the photocell unit P.C., and relay coil R3, which was formerly shunted out by the photocell, is now energized by the branch B+ line 304. Now normally closed contact R3b in line 306 opens, but normally open contact R3a in line 306 closes, with which the relay coil R4 is energized by the previously charged shunt condenser C4.

With relay coil R4 energized, normally open contact R4c in the branch B+ line 308 is closed, conducting current through the diode D to the branch B+ lines 316 and 318, for the underweight and overweight reject relay coils normally closed contact R1c is held open because relay R5 and R6, respectively, however, in branch line 316 coil R1 of the underweight classifying switch circuit is held energized by its shunt capacitor C1, and hence the underweight relay coil R5 is deenergized. Furthermore, since the classification scale switch S4 was also closed by the overweight article during the weight operation, the shunt capacitor C2 for relay coil R2 was also charged during weighing, and capacitor C2 now holds relay R2 energized. This closes normally open contact R2c in branch line 318, and since normally open contact R4c in the branch B+ line 308 ahead of branch line 318 is closed, as explained above, the closing of normally open contact R2c in the branch line 318 energizes the overweight reject relay coil R6. The overweight reject coil shunting capacitor C6 is also charged at this time. When the overweight reject relay coil R6 is energized, a normally open contact R6c in a line 320 leading from the 100-volt DC supply for the deflector solenoids closes. This energizes the rotary overweight reject solenoid coil O, and turns the armature O1 to operate the overweight deflector blade F. Thus, although interruption of the photocell by the overweight article energizes the switch reset coils X1–X4 through line 312 and contact R4c, so that all of the scale switches that were closed now open, the overweight reject relay coil R6 is held energized by its shunt capacitor C6, for a length of time that depends upon the setting of the potentiometer P6. Thus the article has time to reach the projected deflector blade F, before the latter is retracted, even though the photocell beam may have been cleared by the overweight article.

The capacitor C6c that shunts the contact R6c in the DC line 320 reduces arcing at the contact.

Thus, it can be seen that control of the classifying circuit is digital in nature, and that it is precise and can be precisely adjusted. Furthermore, due to the simple capacitor classifying information storage systems built into the circuit, the scale platform can be returned before the actual physical classification (deflection) of the article has been completed. Thus, the scale platform can be readied for reception of a new article from the approach platform. Also, interruption of the photocell beam can reset all switches so that they are ready for a new classification without danger of losing the classification just made, and the scale switches await information to be sensed by the scale beam for the next article to be weighed.

THE FILL CONTROL SYSTEM

The purpose of the fill control system is to prevent the weight of articles from progressively drifting in the overweight or underweight direction, with which eventually all articles would be rejected either as underweight or overweight. Of course, these conditions could be corrected manually, but there is less handling of material—that is, there will be fewer underweight and overweight rejects—if the fill correction takes place automatically and continuously. This is what the fill control system of the present invention accomplishes. This does not mean that in the system of the present invention, every underweight article or every overweight article operates the fill control system. Rather, the fill control system acts on statistical basis, and as will be seen, samples of the article weight condition are taken from time to time, and if the articles are extremely underweight or extremely overweight, the corresponding fill corrections are made. However, and as has been explained, the cut-off points for the fill control system can fall either outside of the reject points (FIG. 32), or they may coincide with, or fall inside of the reject points, depending on the adjustment of the scale switches.

As the system will be described, the fill correction system operates on articles which are outside the limits or normal range of underweight or overweight articles that operate the reject or classifying system, so that the operating range being described is that illustrated in the curve of FIGURE 32.

The operation of the fill control system is illustrated in six diagrams, namely FIGURES 39–44. The diagrams are in pairs; the first pair (FIGS. 39 and 40) refers to system operation under extreme underweight conditions, wherein the fill control system operates to increase the rate of fill. The next pair of diagrams (FIGS. 41 and 42) show the circuit when the articles are accepted, wherein the fill control system is not activated, and the third pair of diagrams (FIGS. 43 and 44) show operation under extreme overweight conditions, with which fill control system operates to reduce the rate of fill.

As seen in FIGURES 39–44, there is a timer T in the fill control circuit, which includes a contact $t$ which is normally open. The timer contact $t$ is closed from time to time by the timer T, to take samples of the weight conditions of the articles on the scale platform. The length of time during which the timer contact $t$ stays open can be regulated by a potentiometer P14, whereas the length of time that it stays closed can be regulated by a potentiometer P15. The internal construction of the timer T is not shown, because the details thereof form no part of the present invention. The timer can be an RC circuit or a mechanical device, without affecting the mode of operation of the fill control system of the invention.

EXTREME UNDERWEIGHT

In FIGURE 39, which illustrates the fill control circuit when an extreme underweight article is being weighed, the scale platform may not be deflected off its stop by such an article, or if it is, it is not deflected sufficiently to close either of the fill control scale switches S2 and S3. Relay coil R3, as previously described in connection with the classification circuit, is shunted out by the photocell, with which relay coil R4 is now energized, so that normally open contact R4c in line 308 remains open, as was also previously described in connection with the classification circuit. This means that the auxiliary B+ line 312 connected between contact R4c in line 308, and the diode D, is not energized, so that although the timer contact $t$, which is in an auxiliary B+ line 330 leading from line 312 might have been closed (as illustrated in FIG. 39) but nothing happens at this time.

FIGURE 40 shows the fill control circuit conditions when the extreme underweight article that has been weighed interrupts the beam of photocell unit P.C. Relay R3 is no longer shunted out by the photocell, but is energized, as previously described. Relay R4 is now energized by its previously charged shunt capacitor C4, as described, and normally open contact R4c in line 308 is now closed. Auxiliary B+ line 330 is now energized, and since the timer contact $t$ is assumed to be closed, a B+ line 332 leading from timer contact $t$ will now also be energized. Current now passes through a normally closed contact R11ca, in a branch B+ line 333, and normally closed contact R11ca remains closed, because the extreme overweight fill control switch S3 has not been closed by an extreme underweight article.

A normally closed contact R10c, in the branch line 333, remains closed, because the extreme underweight article will not close the full control switch S2. Thus with contacts R11ca and R10c closed, the underweight fill control relay R12 is energized. This also charges the relay shunting capacitor C12. The discharge rate of capacitor C12 can be adjusted by a 500,000-ohm potentiometer P12, in series with a small resistor r12.

When the underweight fill control relay R12 is energized, a contact R12c closes, this contact being in the 117-volt AC line that operates the fill correction motor FM, of a filling unit FU. The fill correction motor FM now starts a turn in a direction that will increase the filling rate of the articles, before they pass over the scale platform. A shunting capacitor C16, in series with a 20 ohm resistor r16, is connected across the contact R12c to minimize arcing. Also, when the P.C. beam is cut, the reset coils X2 and X3 for the fill control scale switches S2 and S3 are energized, re-opening these switches.

When the photocell beam is restored by the can K passing on, the information that the filling rate should be increased is stored by condenser C12, which holds relay R12 closed, and contact R12c remains closed for a period of time that depends upon the setting of potentiometer P12, connected across relay R12.

The overweight fill correction relay R13 has not been energized, because the fill control scale switch S3 was not closed when the underweight article was weighed. With scale switch S3 open, the associated relay R11 remains de-energized and a normally open contact R11cb in a branch B+ line 333a remains open during the entire underweight correction process. Thus an overweight fill correction relay R13 that follows contact R11cb in line 333a remains de-energized when the photocell beam is cut.

NORMAL RANGE

FIGURE 41 shows the operation of the fill control system when an article within the normal weight range is being weighed. Such an article may be light enough to leave the underweight reject scale switch S1 open (FIG. 33), or switch S1 may be closed (FIG. 35), but in either case the scale platform is deflected sufficiently to close the fill control scale switch S2. This completes a branch B+ line 334, which in turn energizes the associated relay R10, and begins charging the shunt capacitor C10. Since the beam of the photocell unit P.C. is not yet interrupted, normally open contact R4c in line 308 remains open, line 312 and the auxiliary B+ line 330 are not enegized at this time, as previously described in conjunction with FIGURE 39, and nothing happens in the fill control circuit during this portion of the weighing operation except that the capacitor C10 connected across relay R10 changes.

Referring to FIGURE 42, the normal range article has now interrupted the beam of the photocell, and the relay R3 in line 304 is no longer shunted out by the photocell. Contact R3b now opens, and contact R3a closes, so that capacitor C4 energizes the relay R4, as previously described. The normally open contact R4c in the branch B+ line 308 now closes, and energizes the auxiliary B+ lines 312 and 330. However, the fill correction motor is not activated, because of the condition of the contacts at relays R12 and R13. The scale switch relay R10 is held energized by its previously charged shunting capacitor C10, so that normally closed contacts R10c in branch B+ line 333 is held open. Thus the underweight fill control relay R12 cannot be energized, and the normally open underweight fill correction motor contact R12c remains open. The overweight fill control relay R13 also remains deenergized, because scale switch S3 was not closed by the acceptable article, the capacitor C11 connected across the associated relay R11 was not charged during the weighing operation. Thus the normally open contact R11cb in the branch B+ line 333a remains open, and the overweight fill control relay R13 remains deenergized. With both relays R12 and R13 deenergized, the fill correction motor is not operated in either direction, when an article lying within acceptable weight limits from fill control considerations pass through the apparatus.

However, the reset coils X2 and X3 are energized when the photocell beam is interrupted, to reset all of the scale switches, as previously described.

EXTREME OVERWEIGHT

FIGURE 43 shows the fill control system when an extreme overweight article is being weighed. Under these conditions, both fill control scale switches S2 and S3 are closed by their associated magnets M2 and M3. The branch B+ 334 is completed through the scale switch S2, and relay R10 and its associated charging condenser C10 are energized. Also, in the branch B+ line 336, since scale switch S3 is also closed, the relay R11 and its associated charging condenser C11 are energized. However, as previously described with the photocell beam uninterrupted, relays R3 and R4 are deenergized, and normally open switch R4c in the branch B+ line 308 remains open. Thus the auxiliary B+ lines 312 and 330 are not energized, so that neither the underweight nor the overweight fill control relays R12 and R13, are energized at this time.

FIGURE 44 shows the operation of the fill control circuit when the extreme overweight article breaks from the beam of the photocell unit P.C. Both relays R10 and R11 are held energized by their previously charged shunt condensers C10 and C11, respectively. This means that normally closed contacts R11ca and R10c in the branch B+ line 333 are held open, and under these conditions the underweight fill correction relay R12 will be de-energized. However, normally open contact R11cb in the branch line 333a now closes, energizing the extreme overweight fill correction relay R13 and charging its condenser C13.

Relay R13 energized, a normally open contact R13c closes, connecting the fill correction motor across the 117-volt line. The fill correction motor now runs in the opposite direction from that assumed for extreme underweight articles (FIG. 40), so that the motor now turns in a direction to decrease the rate of fill. The extent to which the fill correction motor runs is determined by the discharge rate of condenser C13, which can be adjusted by the potentiometer P13. As before, the timer contact t is assumed to have been closed to take a sample and energize the auxiliary B+ line 332 leading to the overweight relay R13. The diode D1 shown in the B+ line 330 prevents surges upon operation of the timer contact, which might upset the normal operation of the circuit.

Thus it can be seen that the fill control system is also a precisely adjustable digital system, which has simple fill control storage circuits to permit adequate correction during high speed operation, in that the fill control system need not complete its operation while the article is on the scale platform, but can operate after the article has interrupted the photocell beam, and has continued on its way on the take-away conveyor 28.

The setting of the timer T as to intervals between samplings depends upon the time required for an article to travel from the fill device FU to the scale platform. Thus once a fill correction has been made, a new sampling will not take place until the previously corrected articles have reached the scale platform, and are already to be checked. This prevents over-correction, and minimizes shunting.

As can be seen, applicant has provided a high speed automatic weighing scale or checkweigher, that attains the objects and advantages referred to in the opening statements and during the body of this specification.

Having described the invention so that those skilled in the art may practice the same, I claim:

1. A scale comprising main housing and scale platform assemblies, spring means for mounting said scale platform assembly on said main housing assembly, means for sensing the vertical position of said scale platform assembly comprising a magnetic classifying switch device mounted on one of said assemblies, and a switch closing magnet device mounted on the other of said assemblies; the relative vertical positions of said switch and magnet devices being such that depression of the scale platform from its normal position by articles of a first weigh condition causes the magnet device to leave the switch device open, and articles of a second weight condition cause the magnet device to close said switch device; means for sorting the articles in accordance with each of said weight conditions, and classifying circuit means connected to said switch device and to said article sorting means for actuating said sorting means in accordance with the weight condition of the articles; said switch device including means for maintaining the switch device in its magnetically closed condition after the scale platform has been restored to its normal position, and reset means for reopening the switch device upon operation of said classifying circuit means.

2. The scale of claim 1, wherein said switch device is a reed switch.

3. The scale of claim 2, wherein said switch reset means comprises a coil, and means for connecting said coil to said circuit means for causing the coil to form an electro-magnet of a plurality opposite to that of the switch closing magnet device.

4. The scale of claim 3, wherein said classifying circuit includes a photoelectric unit mounted so that the light beam thereof is interrupted by articles after they have been weighed, said classifying circuit means including means for causing interruption of the beam of said photoelectric unit to energize said switch reset coil.

5. A scale comprising main housing and scale platform assemblies, spring means for mounting said scale platform assembly on said main housing assembly, means for sensing the vertical position of said scale platform assembly comprising first and second magnetic classifying switch devices mounted on one of said assemblies, and first and second switch closing magnet devices mounted on the other of said assemblies; the relative vertical positions of said switch and magnet devices being such that depression of the scale platform from its normal position by articles of a first weight condition causes the magnet devices to leave both switch devices open, articles of a second weight condition cause the magnet devices to close one switch device, and articles of a third weight condition cause the magnet devices to close both switch devices; means for sorting the articles in accordance with each of said weight conditions, and classifying circuit means connected to said switch devices and to said article sorting means for activating said sorting means in accordance with the weight condition of the articles; said classifying circuit means including a photoelectric unit mounted so that the light beam thereof is interrupted by the articles after they have been weighed, and means for storing the article weight condition information between the time that the articles are weighed and the time that said beam is interrupted; said classifying circuit means also including means for operating said sorting means in accordance with said stored weight information, directly upon interruption of the beam of said photoelectric unit.

6. The scale of claim 5, wherein said classifying circuit means also includes means for holding said article sorting means in activating condition for a predetermined time after actuation.

7. The scale of claim 5, wherein said article weight information storing means comprises a plurality of relay coils, each of which is shunted by a capacitor.

8. A combined scale and fill control apparatus comprising main housing and scale platform assemblies, spring means for mounting said scale platform assembly on said main housing assembly, means for sensing the vertical position of said scale platform assembly comprising one set of first and second classifying magnetic switch devices mounted on one of said assemblies, and another set of first and second fill control magnetic switch devices mounted on said one assembly, first and second classifying switch closing and fill control switch closing magnet devices mounted on the other of said assemblies; the relative vertical positions of said switch and magnet devices being such that depression of the scale platform from its normal position by articles of a first weight condition causes the magnet devices to leave all of said switch devices open, articles of a second weight condition cause the magnet devices to close the first of said fill control switch devices while leaving the first of said classifying switch devices open, articles of a third weight condition cause the magnet devices to close the first switch device of both sets of switch devices, articles of a fourth weight condition cause the magnet devices to close the first switch device of both sets and the second classifying switch device while leaving the second fill control switch device open, and with articles of a fifth weight condition closing all of said switch devices; means for sorting the articles in accordance with each of said weight conditions, fill control means, and classifying and fill control circuit means connected to said switch devices and to said article sorting and fill control means.

References Cited
UNITED STATES PATENTS 3,306,442   2/1967   Devol _____ 209—121

ALLEN N. KNOWLES, *Primary Examiner.*

PO-1050
(5/69)

UNITED STATES PATENT OFFICE
CERTIFICATE OF CORRECTION

Patent No. 3,451,549　　　　　　　　Dated June 24, 1969

Inventor(s) P. E. SEABORN

It is certified that error appears in the above-identified patent and that said Letters Patent are hereby corrected as shown below:

Col. 2, line 53, change "FIIGURE" to --FIGURE--.
Col. 3, line 41, change "accepable" to --acceptable--.
Col. 6, line 3, change "the" to --are--.
Col. 6, line 27, change "being" to --begin--.
Col. 6, line 34, change "verner" to --vernier--.
Col. 7, line 13, after "high" insert --fatigue--.
Col. 8, line 37, change "soon" to --seen--.
Col. 9, line 12, change "sacle" to --scale--.
Col. 11, line 9, change "over-correcion tthere" to
　　　　　　　　--over-correction, there--.
Col. 11, line 34, change "too" to --two--.
Col. 12, line 56, delete "ca-".
Col. 16, line 53, change "enegized" to --energized--.
Col. 16, line 70, change "contacts" to --contact--.
Col. 17, line 32, delete "from".
Col. 17, line 40, before "line" insert --B+--.

SIGNED AND
SEALED
SEP 15 1970

(SEAL)
Attest:

Edward M. Fletcher, Jr.

Attesting Officer

WILLIAM E. SCHUYLER, JR.
Commissioner of Patents